(12) United States Patent
Scarfe

(10) Patent No.: US 12,734,769 B2
(45) Date of Patent: Sep. 15, 2026

(54) CURING TOOL ASSEMBLIES, METHODS AND SYSTEMS FOR COMPOSITE MANUFACTURING

(71) Applicant: The Boeing Company, Arlington, VA (US)

(72) Inventor: Manning J. Scarfe, Ascot Vale (AU)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/452,048

(22) Filed: Aug. 18, 2023

(65) Prior Publication Data

US 2025/0018663 A1 Jan. 16, 2025

Related U.S. Application Data

(60) Provisional application No. 63/513,621, filed on Jul. 14, 2023.

(51) Int. Cl.
*B29C 70/48* (2006.01)
*B29C 70/44* (2006.01)
*B29C 70/54* (2006.01)

(52) U.S. Cl.
CPC ............ *B29C 70/48* (2013.01); *B29C 70/443* (2013.01); *B29C 70/54* (2013.01)

(58) Field of Classification Search
CPC .... B29C 2043/3655; B29C 2043/3652; B29C 2043/3647; B29C 2043/3644; B29C 43/3642
See application file for complete search history.

(56) References Cited

U.S. PATENT DOCUMENTS 4,873,044 A * 10/1989 Epel ........................ B29C 70/48 425/389
5,863,452 A 1/1999 Harshberger, Jr. et al.
(Continued)

FOREIGN PATENT DOCUMENTS

EP 2623302 A1 * 8/2013 ............. B29C 70/44
FR 2673571 A1 9/1992

OTHER PUBLICATIONS

European Patent Office, Extended European Search Report, App. No. 24183601.4 (Dec. 11, 2024).
(Continued)

*Primary Examiner* — Matthew J Daniels
(74) *Attorney, Agent, or Firm* — Walters & Wasylyna LLC

(57) ABSTRACT

A curing tool assembly includes a curing tool and a compaction pressure chamber. The curing tool includes a tool surface to receive a dry fabric layup. The compaction pressure chamber overlays the dry fabric layup. The compaction pressure chamber receives a pressurized fluid from a compressed fluid source during resin infusion of the dry fabric layup. The pressurized fluid received at a compaction pressure above a standard atmosphere. A method includes applying a resin pressure above a standard atmosphere to a liquid resin in a liquid resin source; and flowing the liquid resin to a dry fabric layup on a tool surface of a curing tool in response to the resin pressure. The dry fabric layup enclosed in a sealed volume. A compaction pressure above the resin pressure. The liquid resin is infused into the dry fabric layup in response to the resin pressure and the compaction pressure.

20 Claims, 18 Drawing Sheets

(56) References Cited

U.S. PATENT DOCUMENTS

| | | | | |
|---|---|---|---|---|
| 6,406,659 | B1 * | 6/2002 | Lang | B29C 43/12<br>264/102 |
| 8,298,473 | B2 * | 10/2012 | Dull | B29C 33/18<br>156/286 |
| 8,968,617 | B2 * | 3/2015 | Wadsworth | B29C 70/443<br>264/258 |
| 2005/0073076 | A1 | 4/2005 | Woods et al. | |
| 2008/0044506 | A1 * | 2/2008 | Zahlen | B29C 70/548<br>425/130 |
| 2020/0207034 | A1 * | 7/2020 | Meure | B29C 70/546 |
| 2021/0001575 | A1 | 1/2021 | Altan et al. | |

OTHER PUBLICATIONS

European Patent Office, Extended European Search Report, App. No. 26161668.4 (Jun. 26, 2026).

* cited by examiner

CURING TOOL ASSEMBLIES, METHODS AND SYSTEMS FOR COMPOSITE MANUFACTURING

PRIORITY

This application claims priority from U.S. Ser. No. 63/513,621 filed on Jul. 14, 2023.

FIELD

The present disclosure relates generally to distribution of liquid resin in curing tools during composite manufacturing at resin pressures above that of a standard atmosphere and, particularly, to using curing tool assemblies to apply compactions pressures above the resin pressure to a layup during resin infusion. Various techniques for supplying the liquid resin are contemplated. Various techniques for applying the resin pressure to the liquid resin and for applying the compaction pressure to the layup are also contemplated.

BACKGROUND

As structures for composite parts get larger and/or more complex the infusion duration can increase to beyond the working life of the resin or outside the required cycle time for a given production system. This can render a part that is otherwise a strong candidate for resin infusion and/or dry fiber processing to have to utilize alternate and potentially sub optimal processing methods for composite manufacture. The most common approach to increasing infusion pressure is to use resin transfer molding (RTM) techniques in which tooling is matched on both sides. The tooling is held together using a press. This can lead to excessive costs for tooling and equipment, especially as the thickness and profile of the part need to be contained by the tooling on both sides. Moreover, RTM is typically limited to smaller structures as the need to maintain tight tolerances at high pressures makes it difficult to apply to components with larger surface area.

Accordingly, those skilled in the art continue with research and development efforts to improve techniques for resin infusion during composite manufacturing.

SUMMARY

Disclosed are examples of curing tool assemblies, methods and systems for composite manufacturing. The following is a non-exhaustive list of examples, which may or may not be claimed, of the subject matter according to the present disclosure.

In an example, the disclosed curing tool assembly for composite manufacturing includes a curing tool and a compaction pressure chamber. The curing tool includes a tool surface configured to receive a dry fabric layup. The compaction pressure chamber configured to overlay the dry fabric layup received on the tool surface of the curing tool. The compaction pressure chamber further configured to receive a pressurized fluid from at least one compressed fluid source during resin infusion of the dry fabric layup. The pressurized fluid being received at a compaction pressure above that of a standard atmosphere.

In an example, the disclosed method for composite manufacturing includes: (1) applying a resin pressure above that of a standard atmosphere to a liquid resin in at least one liquid resin source; and (2) flowing the liquid resin from the at least one liquid resin source to a dry fabric layup disposed on a tool surface of a curing tool in response to the resin pressure. The dry fabric layup enclosed in a sealed volume. A compaction pressure above the resin pressure being applied to the sealed volume. In this example, the method also includes: (3) infusing the liquid resin into the dry fabric layup in response to the resin pressure and the compaction pressure.

In another example, the disclosed method for composite manufacturing includes: (1) positioning a dry fabric layup on a tool surface of a curing tool; (2) positioning a compaction pressure chamber over the dry fabric layup; (3) sealing the compaction pressure chamber on the tool surface over the dry fabric layup to form a sealed volume between the compaction pressure chamber and the tool surface; and (4) supplying a pressurized fluid from at least one compressed fluid source to the compaction pressure chamber. The pressurized fluid being supplied at a compaction pressure above that of a standard atmosphere. In this example, the method also includes: (5) supplying a liquid resin from at least one liquid resin source to the sealed volume; (6) applying a resin pressure above that of the standard atmosphere to the liquid resin and less than the compaction pressure; (7) flowing the liquid resin from the at least one liquid resin source to a dry fabric layup in response to the resin pressure; and (8) infusing the liquid resin into the dry fabric layup in response to the resin pressure and the compaction pressure.

In an example, the disclosed system for composite manufacturing includes at least one compressed fluid source and a curing tool assembly. The curing tool assembly includes a curing tool, a fluid impervious membrane and a compaction pressure chamber. The curing tool includes a tool surface configured to receive a dry fabric layup. The fluid impervious membrane configured to overlay the dry fabric layup received on the tool surface of the curing tool. The compaction pressure chamber configured to overlay the fluid impervious membrane. The compaction pressure chamber further configured to receive a pressurized fluid from the at least one compressed fluid source during resin infusion of the dry fabric layup. The pressurized fluid being received at a compaction pressure above that of a standard atmosphere.

Other examples of the disclosed curing tool assemblies, methods and systems for composite manufacturing will become apparent from the following detailed description, the accompanying drawings and the appended claims.

DETAILED DESCRIPTION

The various examples of curing tool assemblies, methods and systems for composite manufacturing disclosed herein provide techniques for applying a compaction pressure above that of a standard atmosphere to a dry fabric layup during resin infusion. This enables a resin pressure above that of the standard atmosphere and below the compaction pressure to be applied to a liquid resin during the resin infusion. The resin infusion is faster and more efficient than techniques that apply lower compaction pressures and/or lower resin pressures.

Figure 15:
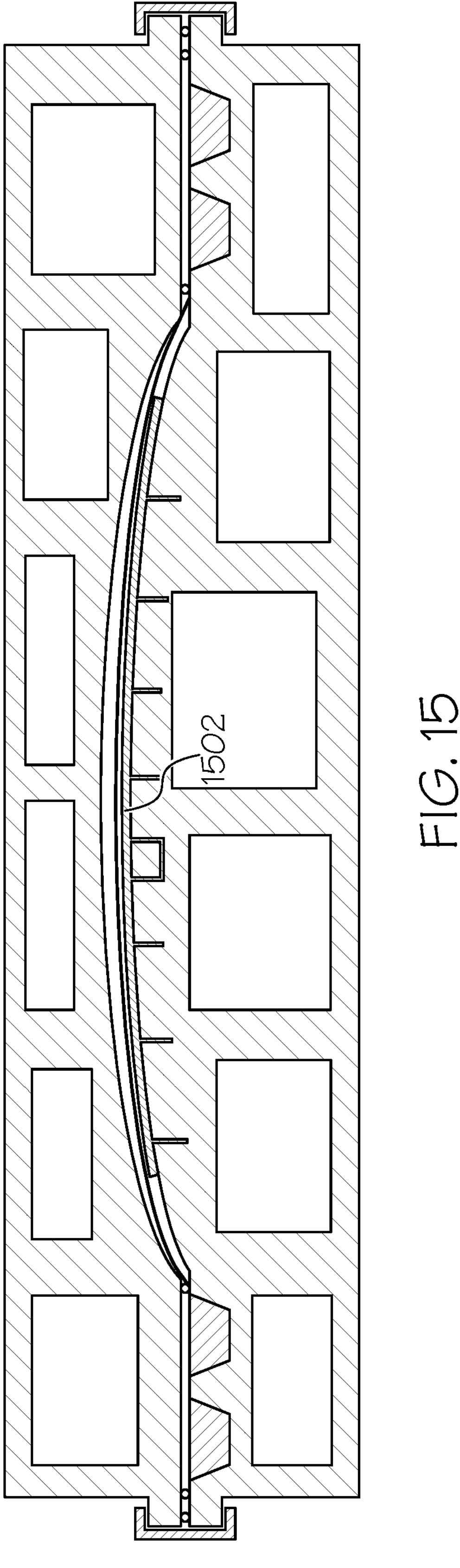
FIG. 15 is a side view cross section showing an example of a preform dry fabric layup for a wing skin/stringer panel ready for resin infusion in an example of a curing tool assembly.
Figure 16:
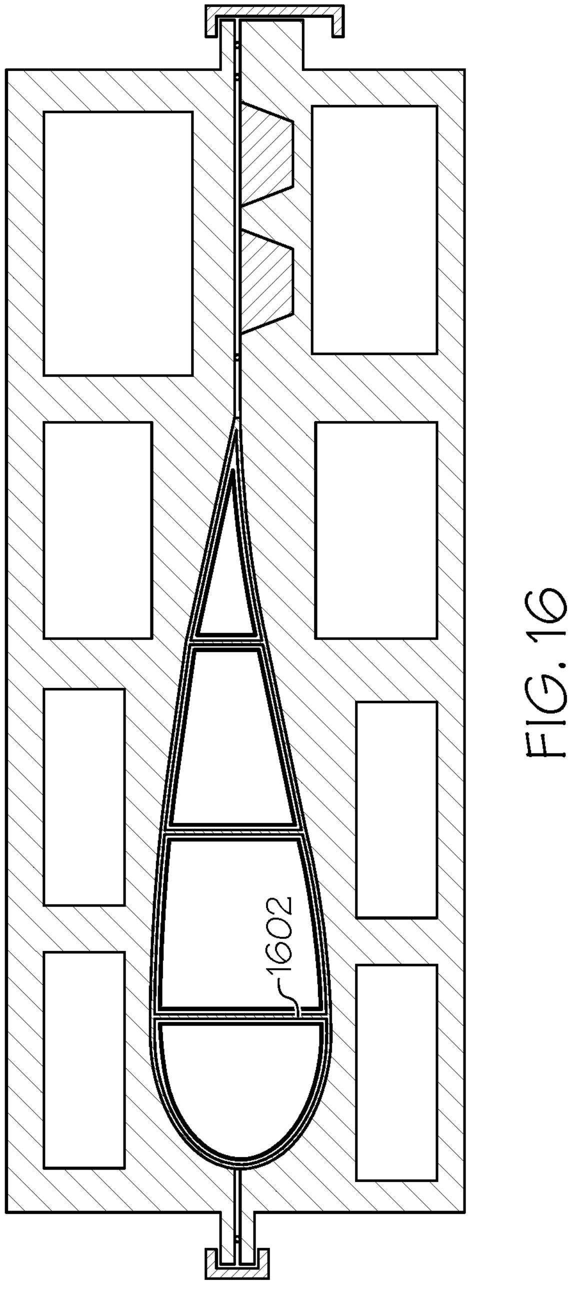
FIG. 16 is a side view cross section showing an example of a preform dry fabric layup for an airfoil section with internal stiffeners ready for resin infusion in another example of a curing tool assembly.

Referring generally to FIGS. 1-4, 15 and 16, by way of examples, the present disclosure is directed to a curing tool assembly 100 for composite manufacturing. FIGS. 1-4 disclose several examples of the curing tool assembly 100. FIG. 15 shows an example of a preform dry fabric layup for a wing skin/stringer panel ready for resin infusion. FIG. 16 shows an example of a preform dry fabric layup for an airfoil section with internal stiffeners ready for resin infusion.

With reference again to FIGS. 1-4, 15 and 16, in one or more examples, a curing tool assembly 100 for composite manufacturing includes a curing tool 102 and a compaction pressure chamber 110. The curing tool 102 includes a tool surface 104 configured to receive a dry fabric layup 106. The compaction pressure chamber 110 configured to overlay the dry fabric layup 106 received on the tool surface 104 of the curing tool 102. The compaction pressure chamber 110 further configured to receive a pressurized fluid 112 from at least one compressed fluid source 114 during resin infusion of the dry fabric layup 106. The pressurized fluid 112 being received at a compaction pressure 148 above that of a standard atmosphere 150. The standard atmosphere 150 is a unit of pressure representative of the mean atmospheric pressure at sea level. For example, the standard atmosphere 150 can be expressed as 14.696 psi.

In another example of the curing tool assembly 100, the dry fabric layup 106 includes a preform dry fabric layup. In a further example, the preform dry fabric layup includes a plurality of dry fabric plies that are tacked using a localized melted thermoplastic veil. In another further example, the preform dry fabric layup is for a wing skin/stringer panel 1502. In yet another further example, the preform dry fabric layup is for an airfoil section with internal stiffeners 1602.

In yet another example of the curing tool assembly 100, the compaction pressure 148 at which the pressurized fluid 112 is received from the at least one compressed fluid source 114 is about two standard atmospheres or higher, about three standard atmospheres or higher, about four standard atmospheres or higher or any other suitable pressure above the standard atmosphere 150. For example, two standard atmospheres can be expressed as 29.392 psi, three standard atmospheres can be expressed as 44.088 psi and four standard atmospheres can be expressed as 58.784 psi. In a further example, the compaction pressure 148 at which the pressurized fluid 112 is received from the at least one compressed fluid source 114 is above a resin pressure 152 applied to a liquid resin 116 during the resin infusion of the dry fabric layup 106. In still another example of the curing tool assembly 100, the pressurized fluid 112 includes a compressed air, a compressed nitrogen, a compressed inert gas or any other suitable pressurized fluid in any suitable combination.

In still yet another example, the curing tool assembly 100 also includes a fluid impervious membrane 108 configured to overlay the dry fabric layup 106 received on the tool surface 104 of the curing tool 102. The fluid impervious membrane 108 positioned between the dry fabric layup 106 and the compaction pressure chamber 110.

In a further example, the fluid impervious membrane 108 includes a rubber material, a thermoplastic elastomer material, a reinforced polyimide, a fiber reinforced elastomeric material, a fiberglass material, a silicone material or any other suitable material in any suitable combination. In another further example, the fluid impervious membrane 108 includes a vacuum bag. In yet another further example of the curing tool assembly 100, the compaction pressure chamber 110 is configured to apply a compaction force on the fluid impervious membrane 108 and the dry fabric layup 106 during the resin infusion in response to receiving the pressurized fluid 112.

In still another further example, the curing tool assembly 100 also includes a curing plate 118 with a plate surface 120 opposing the tool surface 104 of the curing tool 102. The curing plate 118 configured to be clamped to the curing tool 102 to enclose the fluid impervious membrane 108 and the compaction pressure chamber 110 between the curing tool 102 and the curing plate 118 during the resin infusion of the dry fabric layup 106. The curing plate 118 defines a cavity 122 between the fluid impervious membrane 108 and the plate surface 120. In an even further example, the curing plate 118 includes a metallic material. In an even yet further example, the metallic material includes a steel, a stainless steel, a cobalt-chromium alloy or any other suitable metallic material in any suitable combination.

In another even further example, the curing tool assembly 100 also includes a seal 124 configured for placement between a periphery 126 of the plate surface 120 of the curing plate 118 and an adjoining portion 128 of the fluid impervious membrane 108 during the resin infusion. The plate surface 120, the seal 124 and the fluid impervious membrane 108 form the compaction pressure chamber 110 in conjunction with the cavity 122 defined by the curing plate 118. The curing plate 118 configured to receive the pressurized fluid 112 from the at least one compressed fluid source 114 during the resin infusion and configured to provide the pressurized fluid 112 to the compaction pressure chamber 110 during the resin infusion.

In yet another even further example of the curing tool assembly 100, the compaction pressure chamber 110 includes at least one inflatable bladder 202. The curing plate 118 is configured to receive the pressurized fluid 112 from the at least one compressed fluid source 114 and configured to provide the pressurized fluid 112 to each of the at least one inflatable bladder 202.

In another further example of the curing tool assembly 100, the tool surface 104 of the curing tool 102 includes one or more resin supply areas 302 defining at least one resin well 304. The one or more resin supply areas 302 of the tool surface 104 spaced from a composite part area 306 of the tool surface 104. Each resin well 304 configured to hold and supply a liquid resin 116 during the resin infusion. The composite part area 306 configured to receive the dry fabric layup 106.

In an even further example, the curing tool assembly 100 also includes at least one resin pressure chamber 308 configured to overlay the at least one resin well 304 of the curing tool 102. The at least one resin pressure chamber 308 further configured to receive a second pressurized fluid 310 from the at least one compressed fluid source 114 during the resin infusion of the dry fabric layup 106. The second pressurized fluid 310 being received at a resin pressure 152 above that of the standard atmosphere 150 and less than the compaction pressure 148 of the pressurized fluid 112 associated with the compaction pressure chamber 110. The standard atmosphere 150 is a unit of pressure representative of the mean atmospheric pressure at sea level. For example, the standard atmosphere 150 can be expressed as 14.696 psi.

In an even yet further example, curing tool assembly 100 also includes a curing plate 118 with a plate surface 120 opposing the tool surface 104 of the curing tool 102. The curing plate 118 configured to be clamped to the curing tool 102 to enclose the fluid impervious membrane 108, the at least one resin pressure chamber 308 and the compaction pressure chamber 110 between the curing tool 102 and the curing plate 118 during the resin infusion of the dry fabric layup 106. The curing plate 118 defines a cavity 122 between the fluid impervious membrane 108 and the plate surface 120.

In a further alternative, the curing tool assembly 100 also includes a seal 124 and a second seal 312. The seal 124 configured for placement between a periphery 126 of the plate surface 120 of the curing plate 118 and an adjoining portion 128 of the fluid impervious membrane 108 during the resin infusion. The second seal 312 configured for placement between the plate surface 120 of the curing plate 118 and the fluid impervious membrane 108 to isolate the at least one resin pressure chamber 308 from the compaction pressure chamber 110 during the resin infusion. The plate surface 120, the seal 124, the second seal 312 and the fluid impervious membrane 108 form the at least one resin pressure chamber 308 and the compaction pressure chamber 110. The curing plate 118 is configured to receive the pressurized fluid 112 from the at least one compressed fluid source 114 and configured to provide the pressurized fluid 112 to the compaction pressure chamber 110. The curing plate 118 is configured to receive the second pressurized fluid 310 from the at least one compressed fluid source 114 and configured to provide the second pressurized fluid 310 to the at least one resin pressure chamber 308.

In another further alternative of the curing tool assembly 100, the at least one resin pressure chamber 308 includes an inflatable bladder 402. The curing plate 118 is configured to receive the second pressurized fluid 310 from the at least one compressed fluid source 114 and configured to provide the second pressurized fluid 310 to the inflatable bladder 402.

In yet another further example, the curing tool assembly 100 also includes a seal 130 configured for placement between a periphery 132 of the tool surface 104 of the curing tool 102 and an adjoining portion 128 of the fluid impervious membrane 108 to form a sealed volume 134 around the dry fabric layup 106 during the resin infusion. In an even further example, the curing tool 102 is configured to receive a liquid resin 116 from at least one liquid resin source 136 during the resin infusion and configured to supply the liquid resin 116 to the sealed volume 134 during the resin infusion.

In an even yet further example of the curing tool assembly 100, the liquid resin 116 is received at a resin pressure 152 above that of the standard atmosphere 150 and less than the compaction pressure 148 of the pressurized fluid 112 associated with the compaction pressure chamber 110. The standard atmosphere 150 is a unit of pressure representative of the mean atmospheric pressure at sea level. For example, the standard atmosphere 150 can be expressed as 14.696 psi. In a further alternative, the at least one liquid resin source 136 includes one or more resin pressure pots 138, one or more resin injection machines or any other suitable liquid resin source in any suitable combination.

In another even yet further example of the curing tool assembly 100, the curing tool 102 is configured for fluid communication with at least one vacuum pump 140 to draw a vacuum on the sealed volume 134 during the resin infusion. In a further alternative, the curing tool assembly 100 is configured to use the vacuum to draw the liquid resin 116 into the sealed volume 134 during the resin infusion. In another further alternative, the curing tool assembly 100 is configured to use the vacuum to draw residual resin from the sealed volume 134 toward the at least one vacuum pump 140 for collection in a resin waste bin 142 during the resin infusion.

Figure 1:
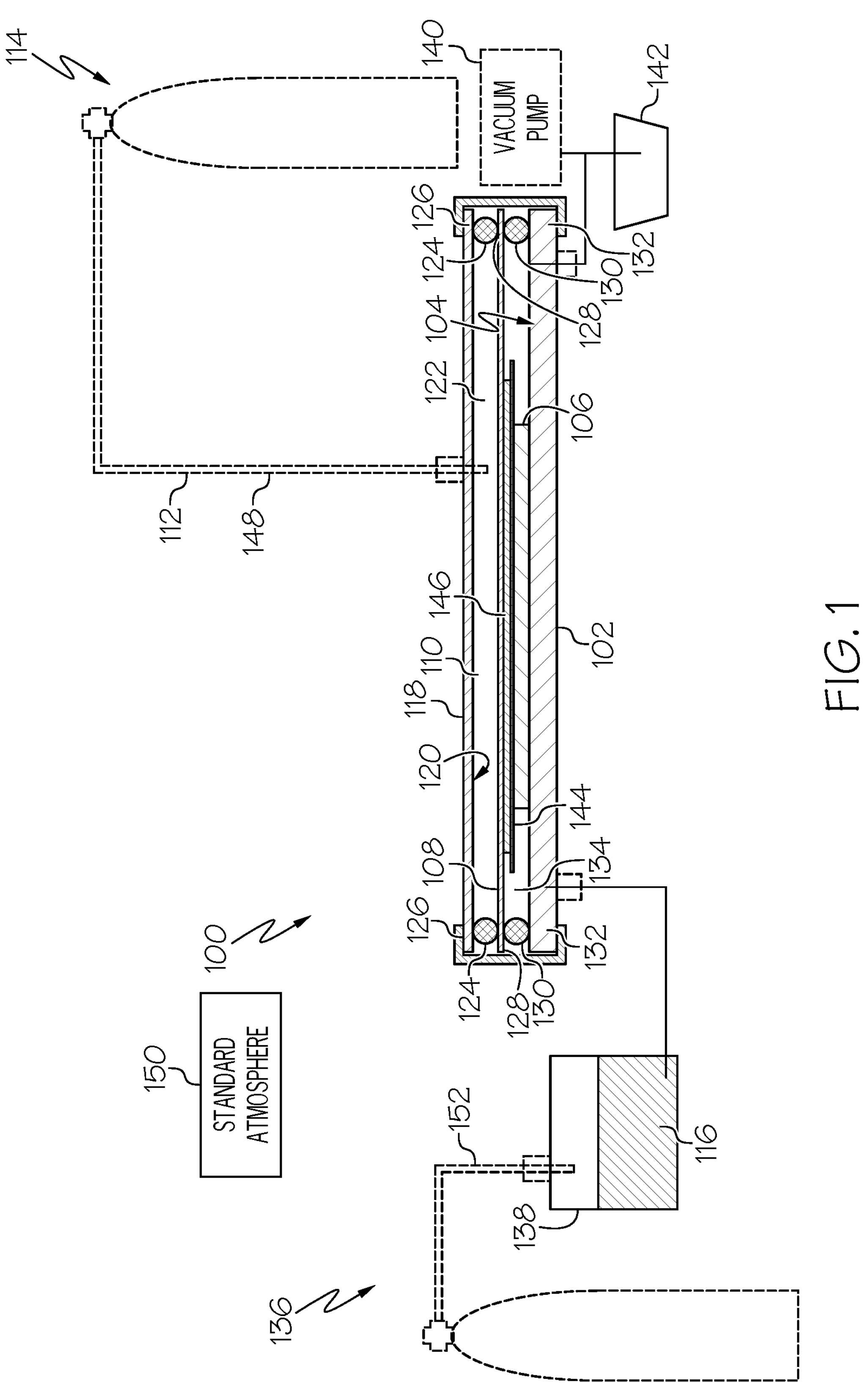
FIG. 1 is a functional diagram of an example of a curing tool assembly for composite manufacturing.
Figure 2:
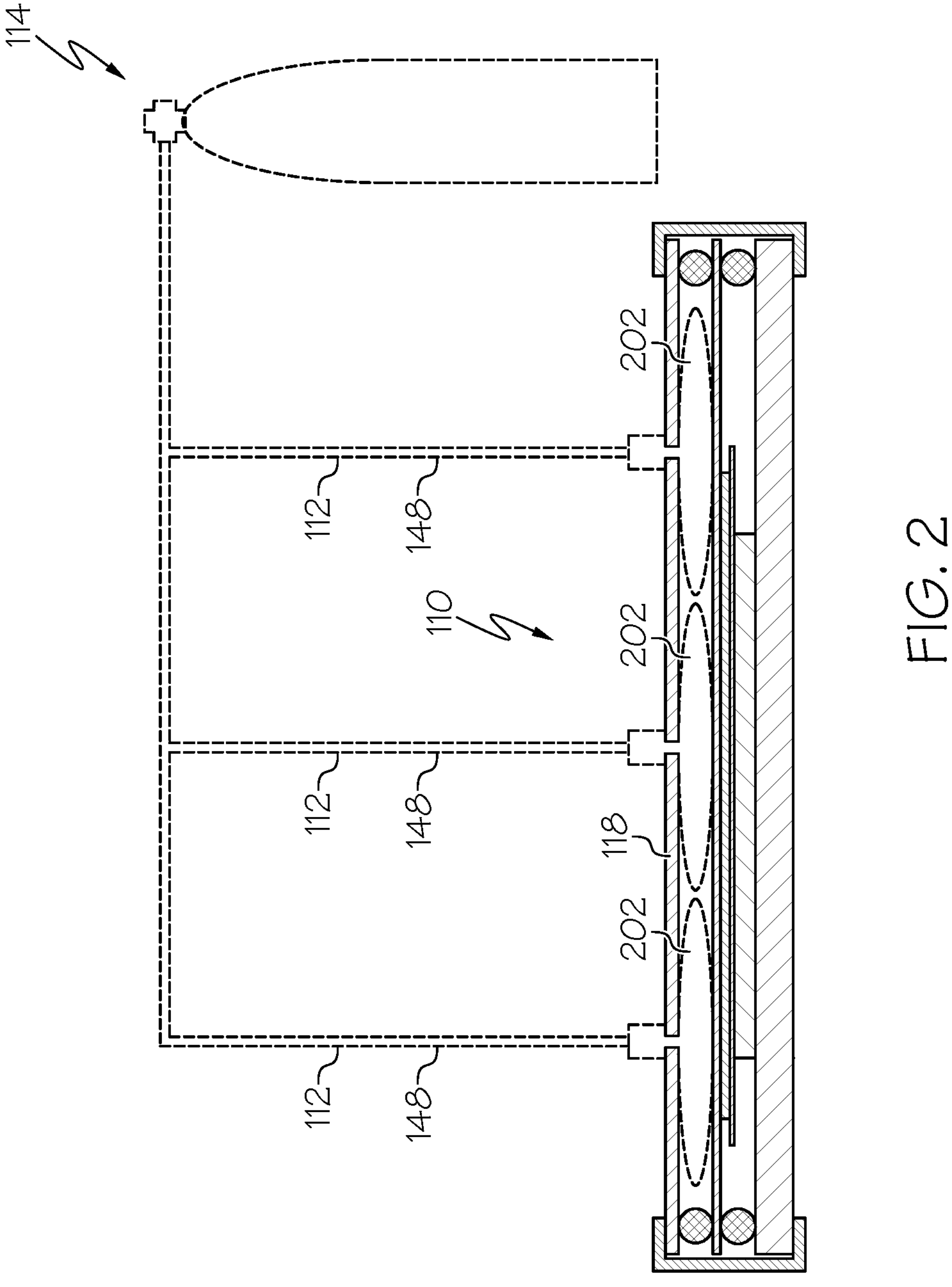
FIG. 2 is functional diagram of another example of a curing tool assembly that includes examples of inflatable bladders in a compaction pressure chamber.
Figure 3:
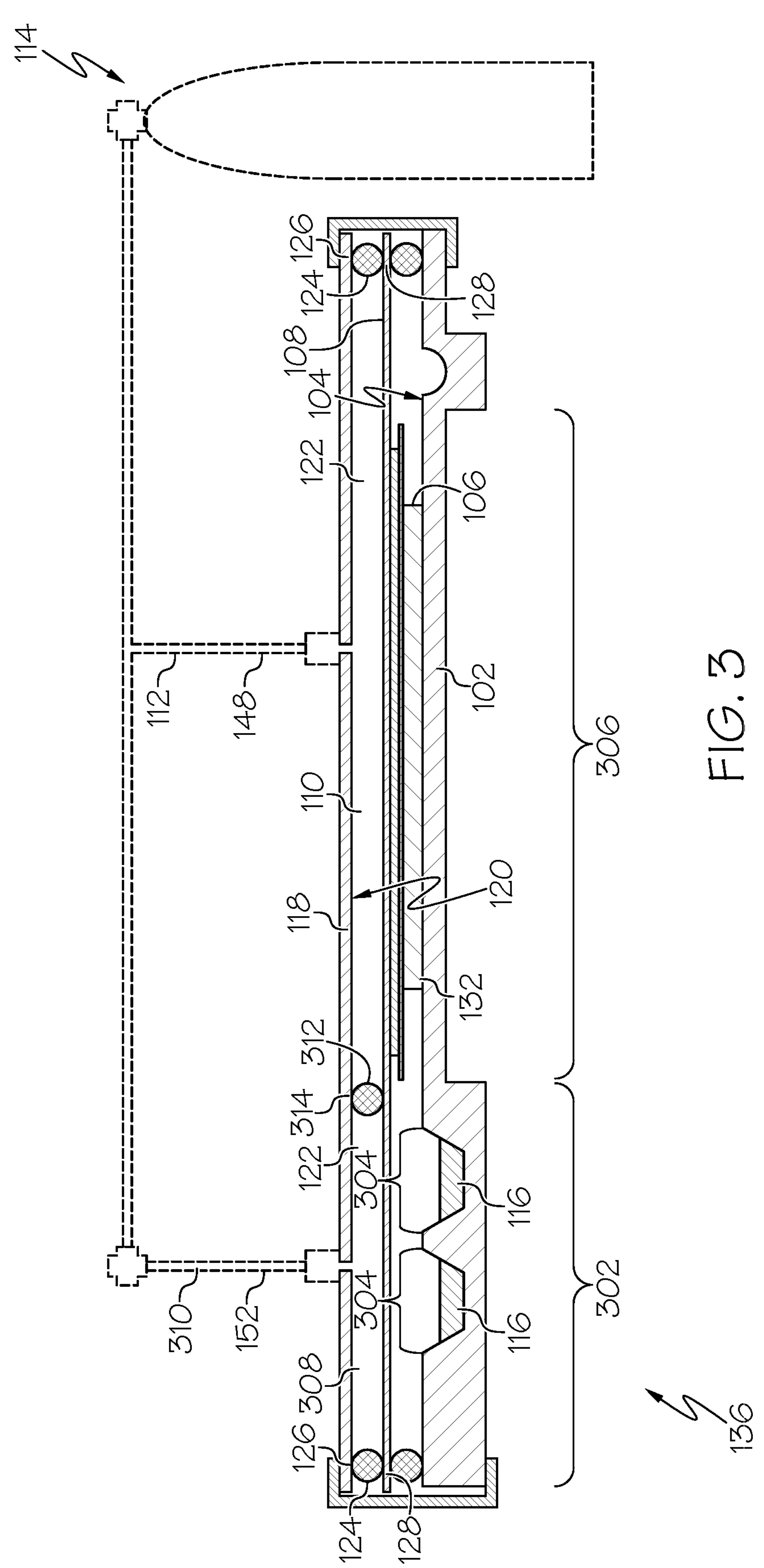
FIG. 3 is a functional diagram of yet another example of a curing tool assembly that includes a curing plate, a fluid impervious membrane and seals to form a resin pressure chamber and a compaction pressure chamber.
Figure 4:
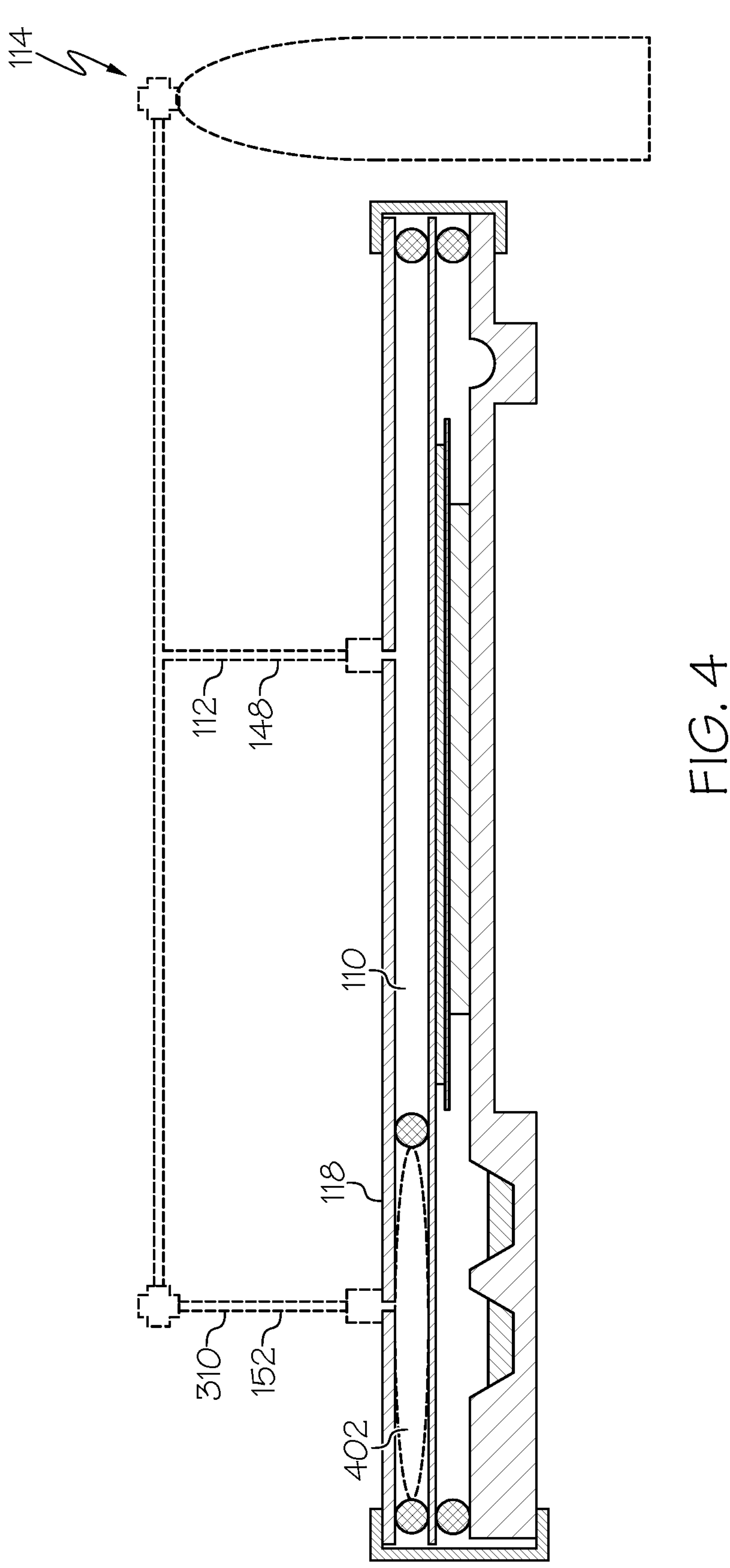
FIG. 4 is functional diagram of still another example of a curing tool assembly that includes an example of an inflatable bladder in a resin pressure chamber.
Figure 17:
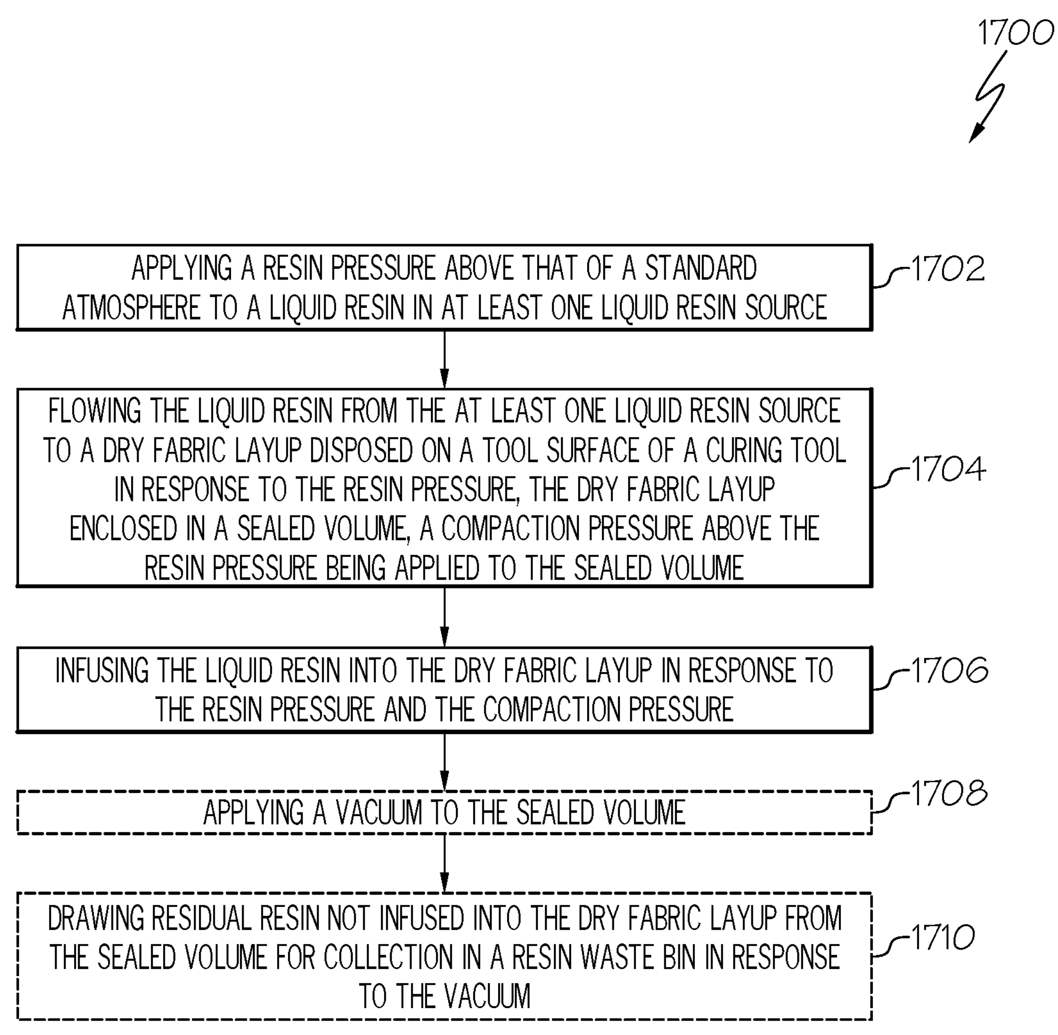
FIG. 17 is a flow diagram of another example of a method for composite manufacturing.

Referring generally to FIGS. 1 and 17, by way of examples, the present disclosure is directed to a method 1700 for composite manufacturing. FIG. 1 discloses an example of a curing tool assembly 100. FIG. 17 discloses the method 1700 for composite manufacturing.

With reference again to FIGS. 1 and 17, in one or more examples, a method 1700 for composite manufacturing includes applying 1702 a resin pressure 152 above that of a standard atmosphere 150 to a liquid resin 116 in at least one liquid resin source 136. At 1704, the liquid resin 116 is flowed from the at least one liquid resin source 136 to a dry fabric layup 106 disposed on a tool surface 104 of a curing tool 102 in response to the resin pressure 152. The dry fabric layup 106 enclosed in a sealed volume 134. A compaction pressure 148 above the resin pressure 152 being applied to the sealed volume 134. At 1706, the liquid resin 116 is infused into the dry fabric layup 106 in response to the resin pressure 152 and the compaction pressure 148. The standard atmosphere 150 is a unit of pressure representative of the mean atmospheric pressure at sea level. For example, the standard atmosphere 150 can be expressed as 14.696 psi.

In another example of the method 1700, the resin pressure 152 applied to the liquid resin 116 is about 1.5 standard atmospheres or higher, about 2.5 standard atmospheres or higher, about 3.5 standard atmospheres or higher or any other suitable pressure above the standard atmosphere 150. For example, 1.5 standard atmospheres can be expressed as 22.044 psi, 2.5 standard atmospheres can be expressed as 36.74 psi and 3.5 standard atmospheres can be expressed as 51.436 psi. In yet another example of the method 1700, the compaction pressure 148 applied to the sealed volume 134 is about two standard atmospheres or higher, about three standard atmospheres or higher, about four standard atmospheres or higher, or any other suitable pressure above the standard atmosphere 150. For example, two standard atmospheres can be expressed as 29.392 psi, three standard atmospheres can be expressed as 44.088 psi and four standard atmospheres can be expressed as 58.784 psi.

In still another example, the method 1700 also includes applying 1708 a vacuum to the sealed volume 134. At 1710, residual resin not infused into the dry fabric layup 106 is drawn from the sealed volume 134 for collection in a resin waste bin 142 in response to the vacuum.

Figure 5:
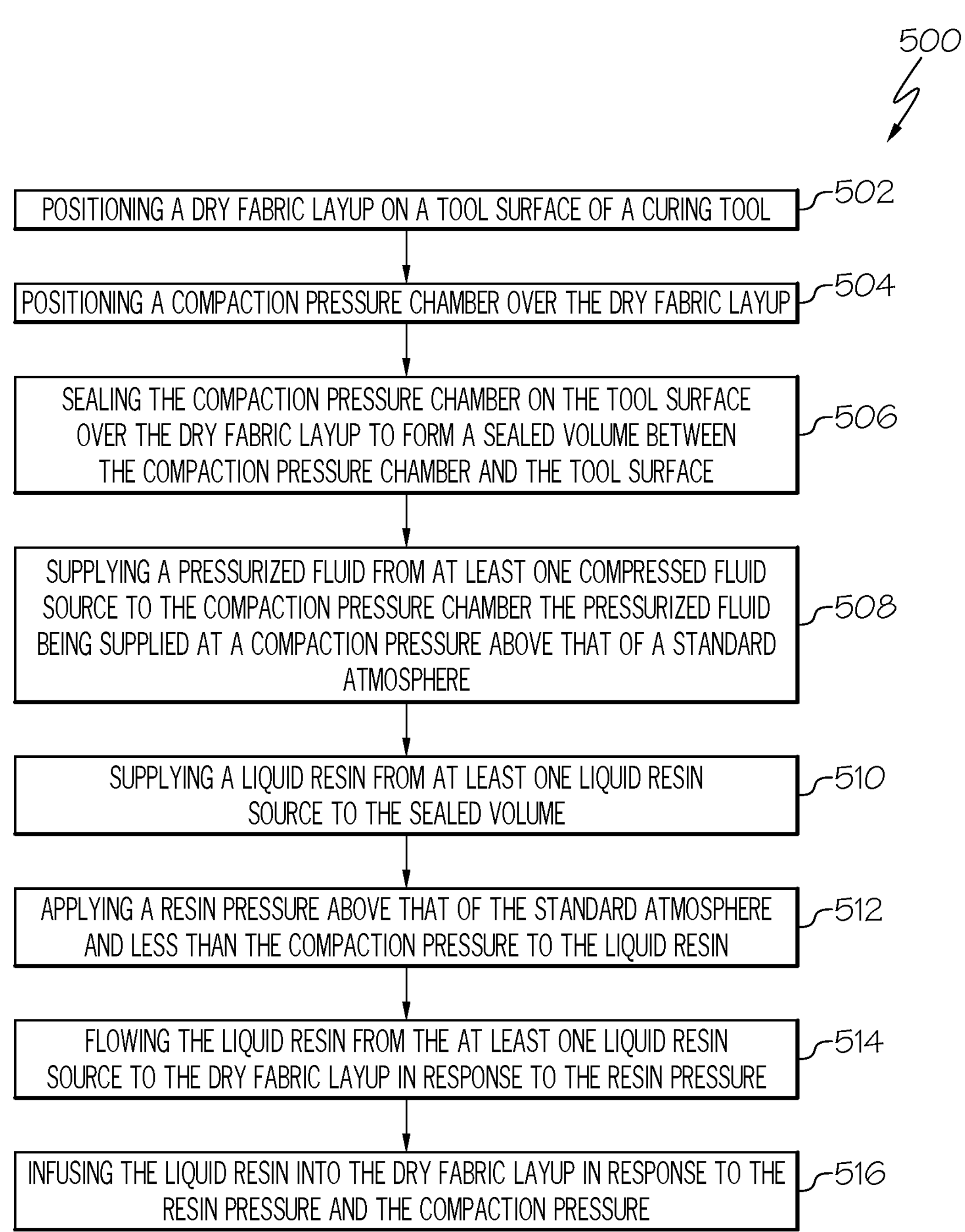
FIG. 5 is a flow diagram of an example of a method for composite manufacturing.
Figures 6, 7:
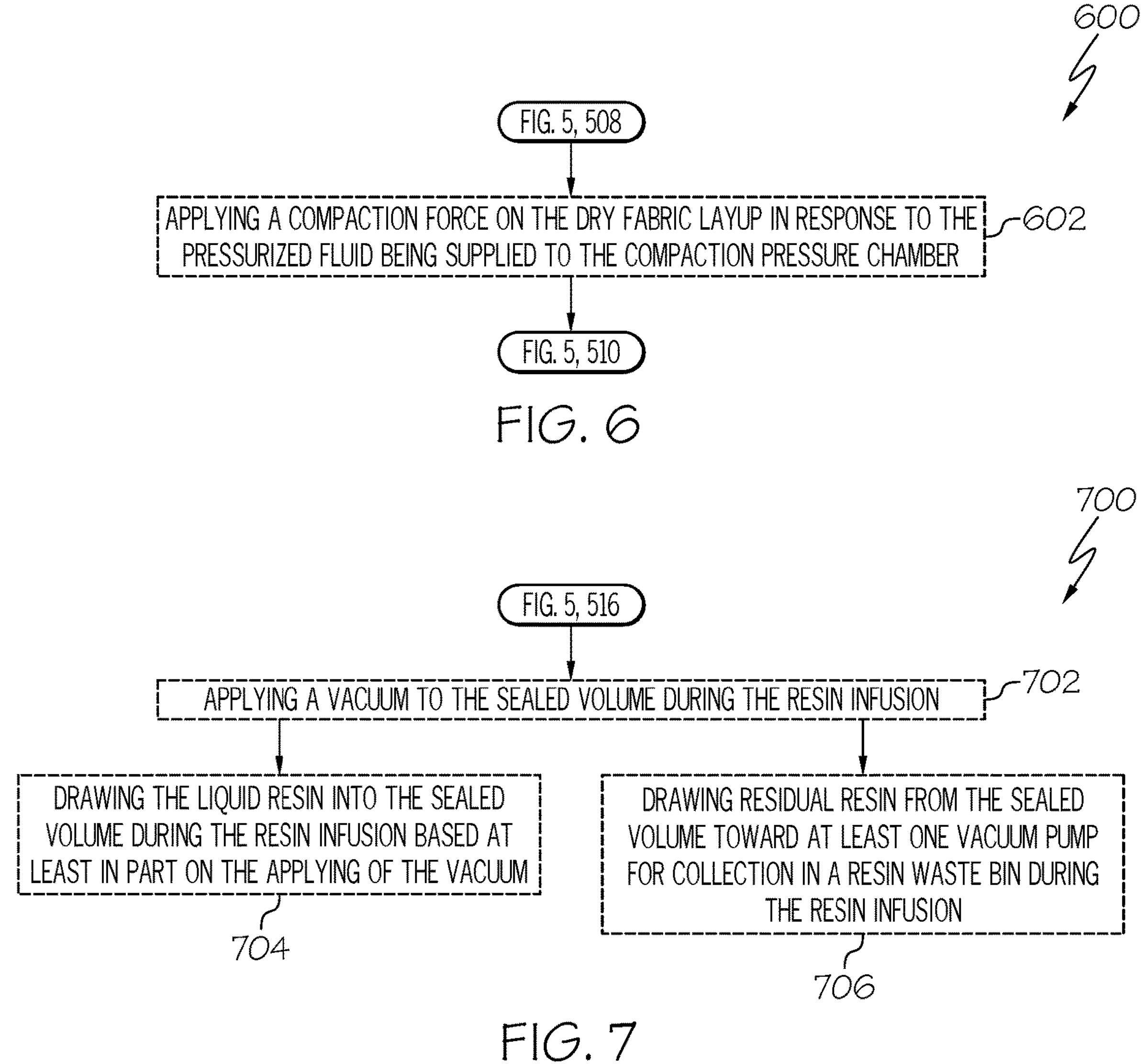
FIG. 6, in combination with FIG. 5, is a flow diagram of another example of a method for composite manufacturing.
FIG. 7, in combination with FIG. 5, is a flow diagram of yet another example of a method for composite manufacturing.
Figure 8:
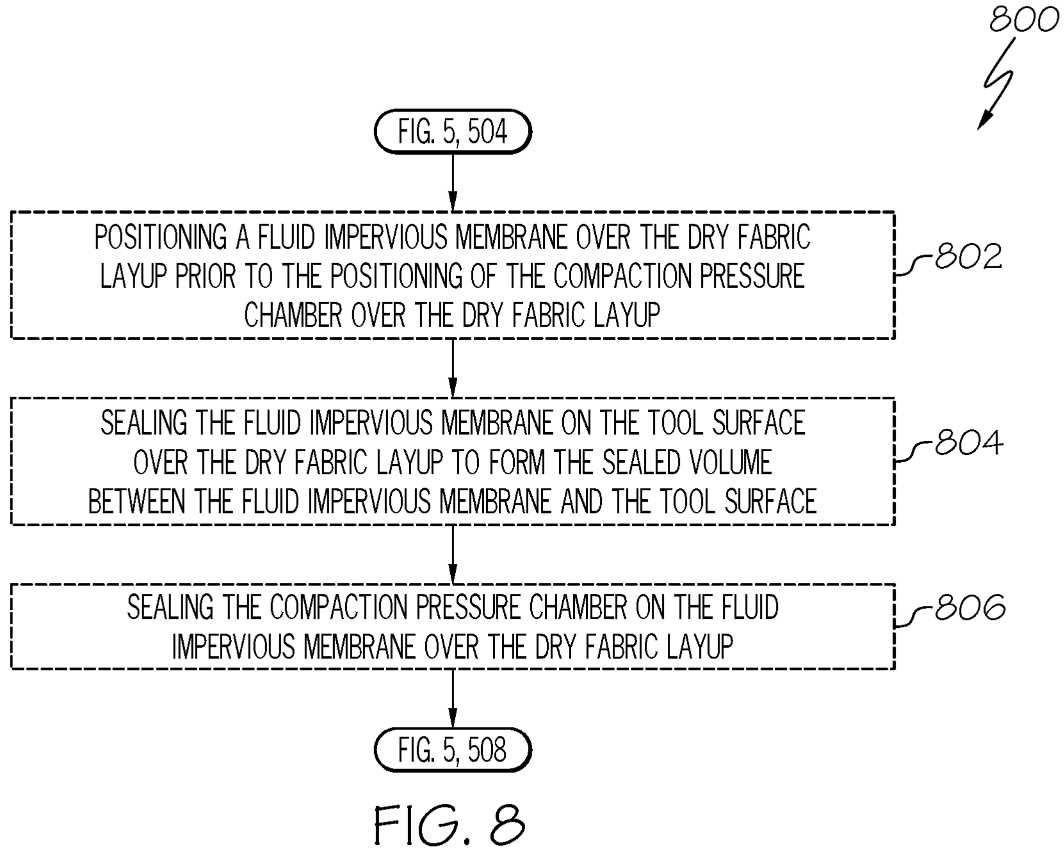
FIG. 8, in combination with FIG. 5, is a flow diagram of still another example of a method for composite manufacturing.
Figure 9:
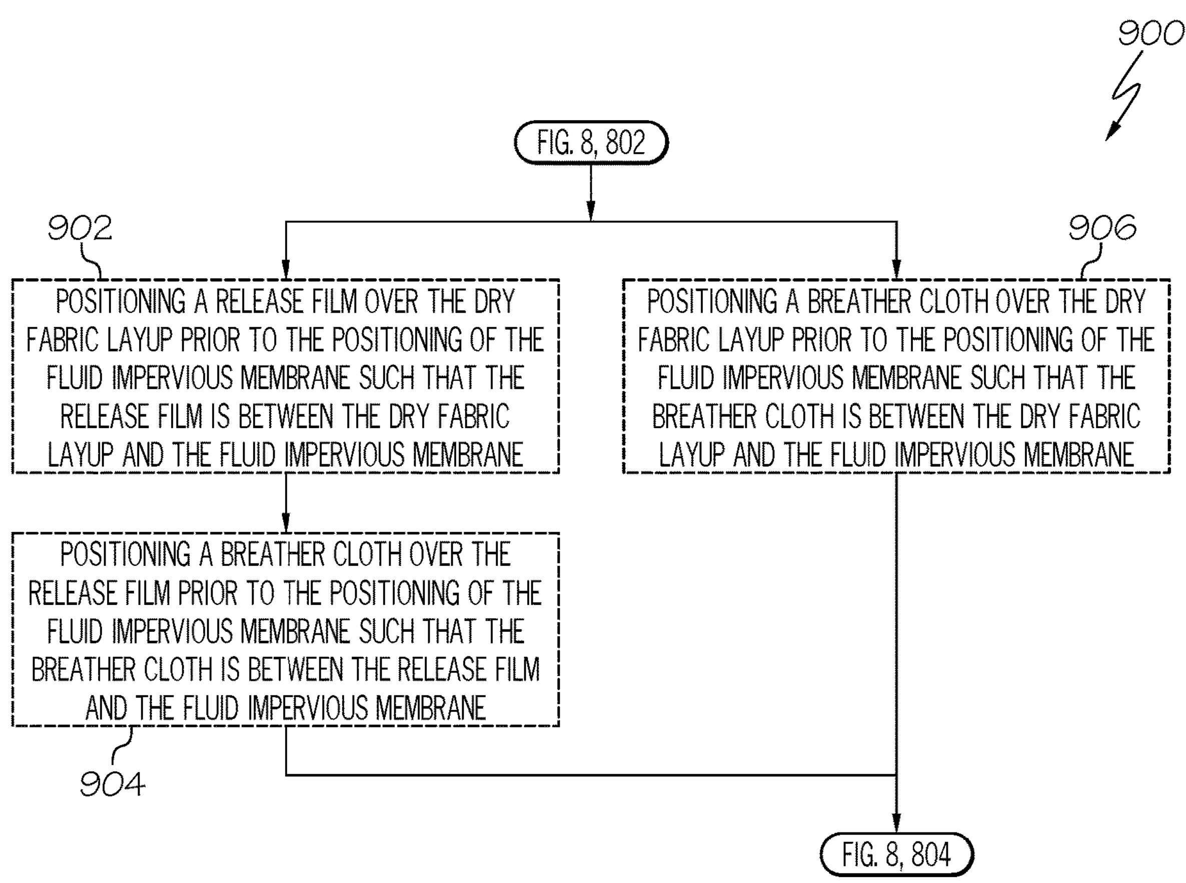
FIG. 9, in combination with FIGS. 5 and 8, is a flow diagram of still yet another example of a method for composite manufacturing.
Figure 10:
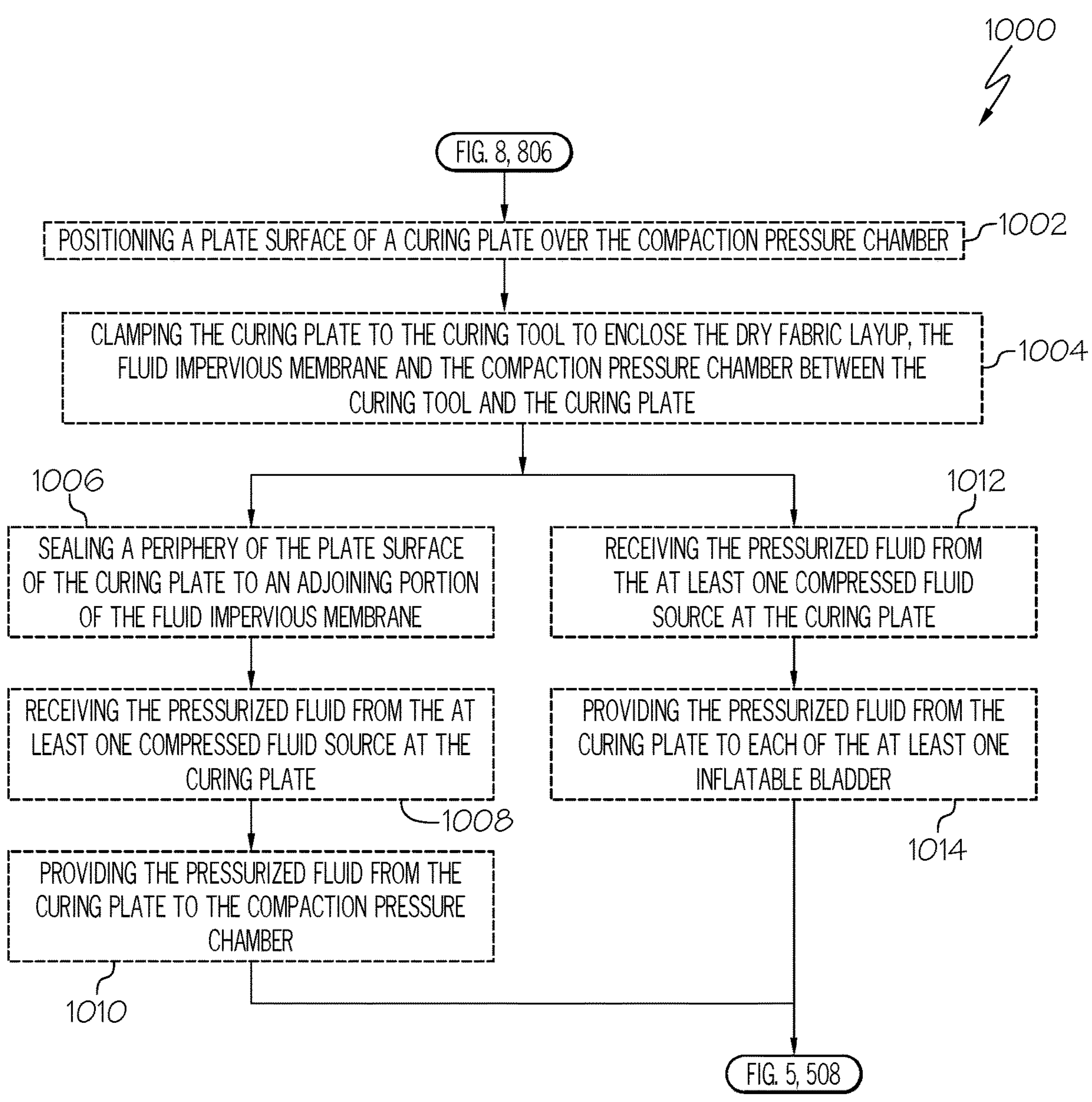
FIG. 10, in combination with FIGS. 5 and 8, is a flow diagram of another example of a method for composite manufacturing.
Figure 11:
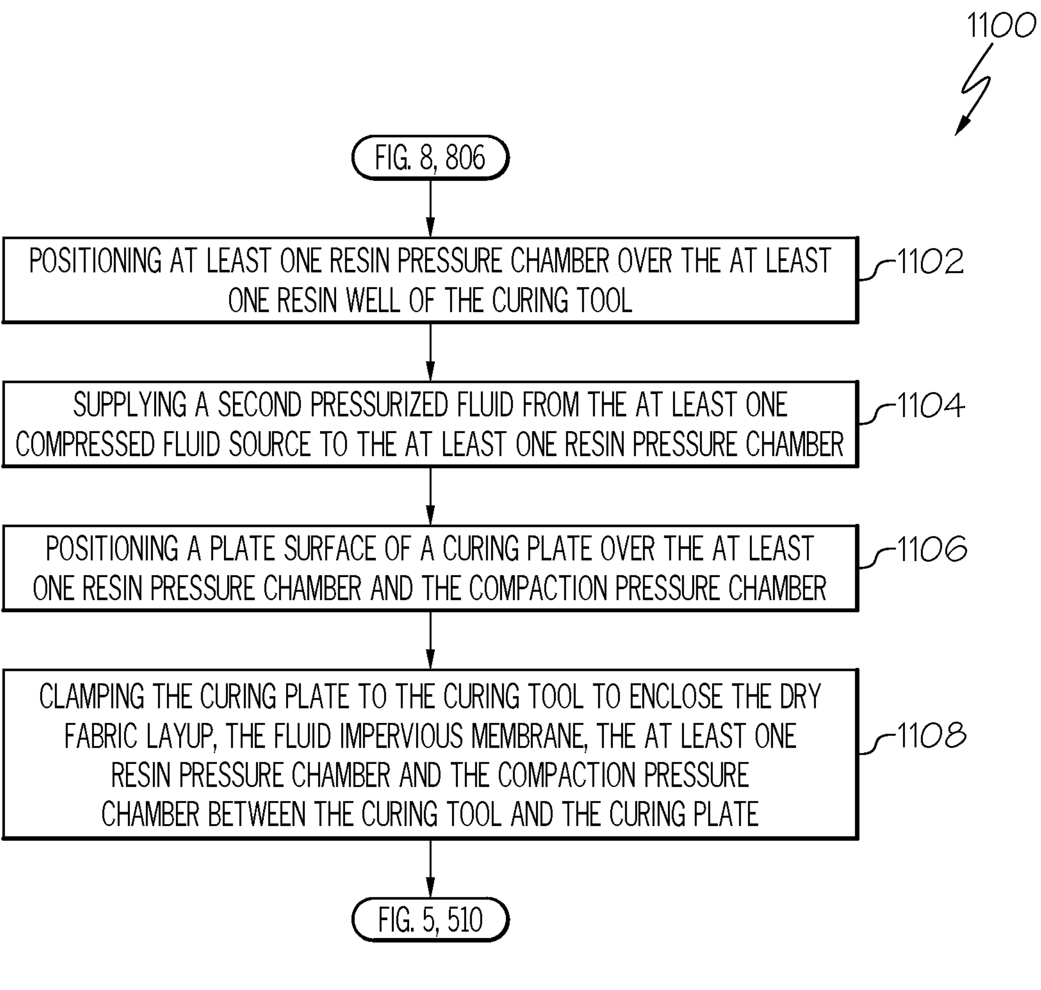
FIG. 11, in combination with FIGS. 5 and 8, is a flow diagram of yet another example of a method for composite manufacturing.
Figure 12:
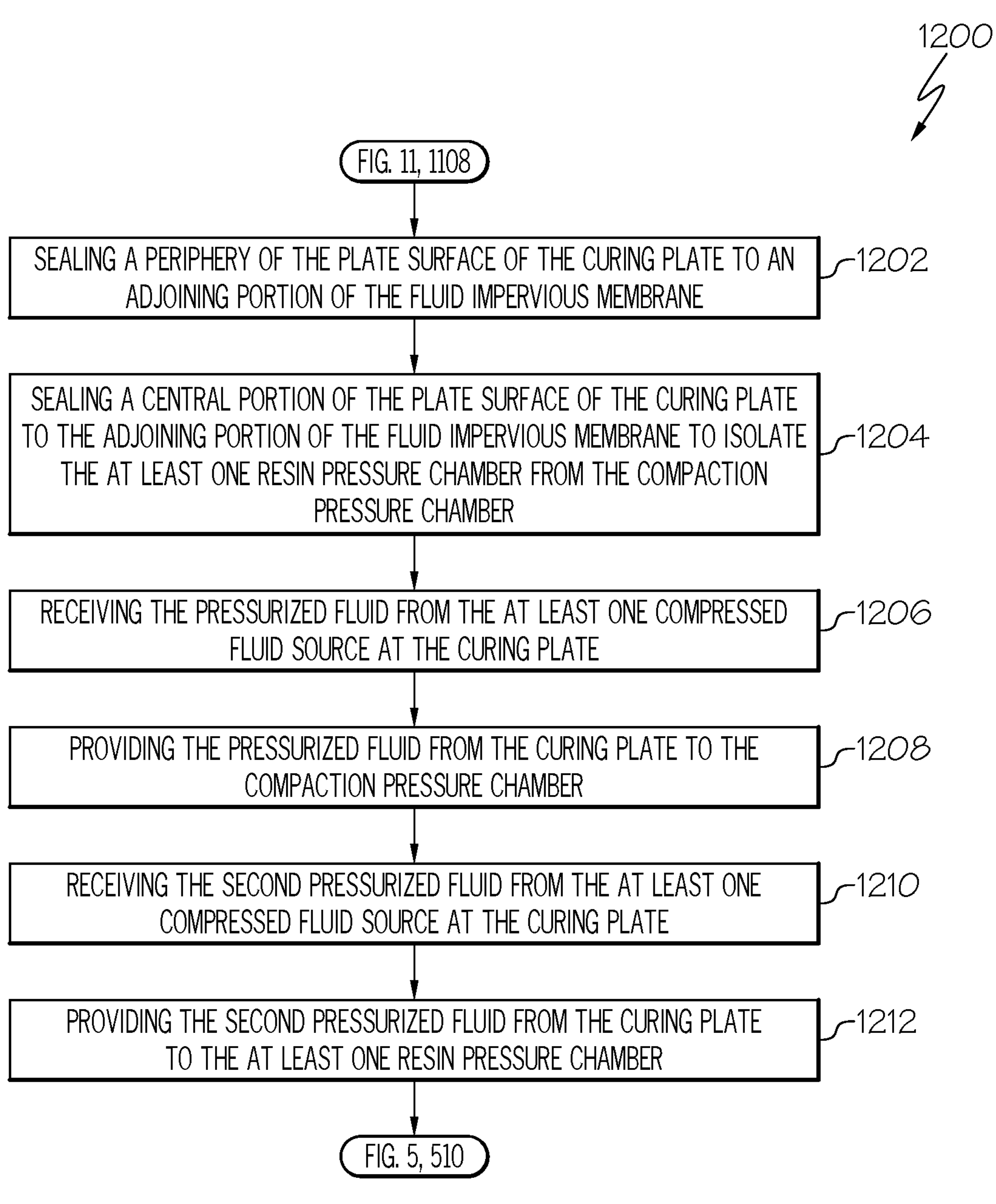
FIG. 12, in combination with FIGS. 5, 8 and 11, is a flow diagram of still another example of a method for composite manufacturing.
Figure 13:
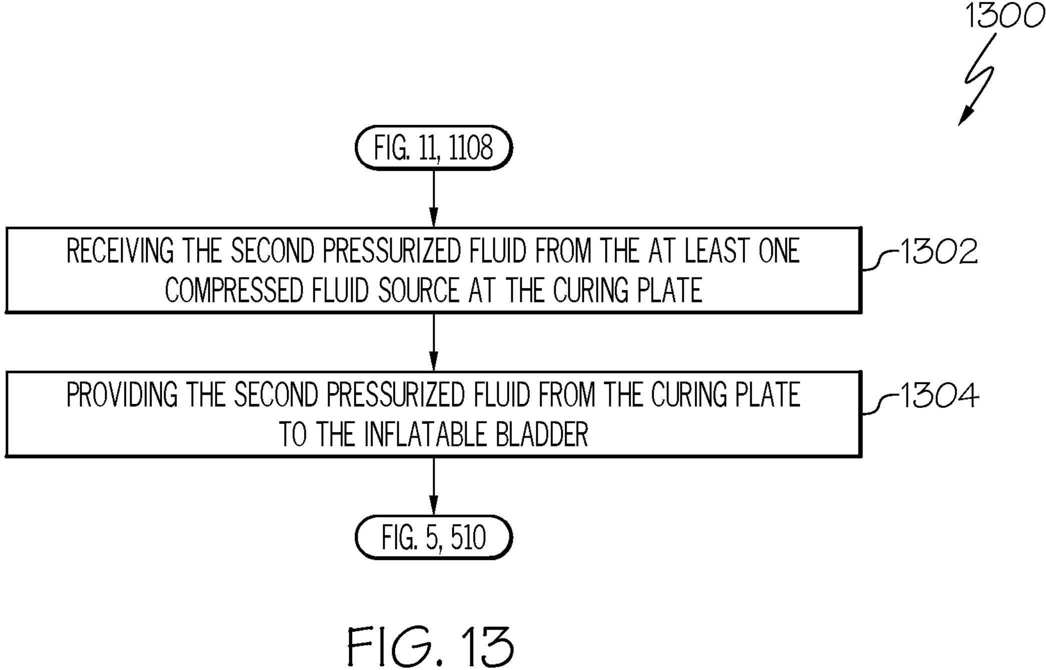
FIG. 13, in combination with FIGS. 5, 8 and 11, is a flow diagram of still yet another example of a method for composite manufacturing.

Referring generally to FIGS. 1-13, by way of examples, the present disclosure is directed to methods 500, 600, 700, 800, 900, 1000, 1100, 1200, 1300 for composite manufacturing. FIGS. 1-4 disclose several examples of the curing tool assembly 100. FIG. 5 discloses the method 500 for composite manufacturing. FIG. 6, in combination with FIG. 5, discloses the method 600 for composite manufacturing. FIG. 7, in combination with FIG. 5, discloses the method 700 for composite manufacturing. FIG. 8, in combination with FIG. 5, discloses the method 800 for composite manufacturing. FIG. 9, in combination with FIGS. 5 and 8, discloses the method 900 for composite manufacturing. FIG. 10, in combination with FIGS. 5 and 8, discloses the method 1000 for composite manufacturing. FIG. 11, in combination with FIGS. 5 and 8, discloses the method 1100 for composite manufacturing. FIG. 12, in combination with FIGS. 5, 8 and 11, discloses the method 1200 for composite manufacturing. FIG. 13, in combination with FIGS. 5, 8 and 11, discloses the method 1300 for composite manufacturing.

With reference again to FIGS. 1 and 5, in one or more examples, a method 500 for composite manufacturing includes positioning 502 a dry fabric layup 106 on a tool surface 104 of a curing tool 102. At 504, a compaction pressure chamber 110 is positioned over the dry fabric layup 106. At 506, the compaction pressure chamber 110 is sealed on the tool surface 104 over the dry fabric layup 106 to form a sealed volume 134 between the compaction pressure chamber 110 and the tool surface 104. At 508, a pressurized fluid 112 from at least one compressed fluid source 114 is supplied to the compaction pressure chamber 110. The pressurized fluid 112 being supplied at a compaction pressure 148 above that of a standard atmosphere 150. At 510, a liquid resin 116 from at least one liquid resin source 136 is supplied to the sealed volume 134. At 512, a resin pressure 152 above that of the standard atmosphere 150 and less than the compaction pressure 148 is applied to the liquid resin 116. At 514, the liquid resin 116 is flowed from the at least one liquid resin source 136 to the dry fabric layup 106 in response to the resin pressure 152. At 516, the liquid resin 116 is infused into the dry fabric layup 106 in response to the resin pressure 152 and the compaction pressure 148. The standard atmosphere 150 is a unit of pressure representative of the mean atmospheric pressure at sea level. For example, the standard atmosphere 150 can be expressed as 14.696 psi.

With reference again to FIGS. 1, 5 and 6, in one or more examples, a method 600 for composite manufacturing includes the method 500 of FIG. 5 and continues from 508 to 602 where a compaction force is applied on the dry fabric layup 106 in response to the pressurized fluid 112 being supplied to the compaction pressure chamber 110. From 602, the method 600 advances to 510 of FIG. 5.

With reference again to FIGS. 1 and 5, in another example of the method 500, the compaction pressure 148 at which the pressurized fluid 112 is supplied to the compaction pressure chamber 110 is about two standard atmospheres or higher, about three standard atmospheres or higher, about four standard atmospheres or higher or any other suitable pressure above the standard atmosphere 150. For example, two standard atmospheres can be expressed as 29.392 psi, three standard atmospheres can be expressed as 44.088 psi and four standard atmospheres can be expressed as 58.784 psi. In a further example, the compaction pressure 148 at which the pressurized fluid 112 is supplied from the at least one compressed fluid source 114 is above the resin pressure 152 applied to the liquid resin 116 for resin infusion of the dry fabric layup 106. In yet another example of the method 500, the at least one liquid resin source 136 includes one or more resin pressure pots 138. In still another example of the method 500, the at least one liquid resin source 136 includes one or more resin injection machines.

With reference again to FIGS. 1, 5 and 7, in one or more examples, a method 700 for composite manufacturing includes the method 500 of FIG. 5 and continues from 516 to 702 where the infusing 516 of the liquid resin 116 includes applying 702 a vacuum to the sealed volume 134 during the resin infusion. At 704, the infusing 516 also includes drawing 704 the liquid resin 116 into the sealed volume 134 during the resin infusion based at least in part on the applying 702 of the vacuum. At 706, the infusing 516 also includes drawing 706 residual resin from the sealed volume 134 toward at least one vacuum pump 140 for collection in a resin waste bin 142 during the resin infusion.

With reference again to FIGS. 1, 5 and 8, in one or more examples, a method 800 for composite manufacturing includes the method 500 of FIG. 5 and continues from 504 to 802 where a fluid impervious membrane 108 is positioned over the dry fabric layup 106 prior to the positioning 504 of the compaction pressure chamber 110 over the dry fabric layup 106. At 804, the fluid impervious membrane 108 is sealed on the tool surface 104 over the dry fabric layup 106 to form the sealed volume 134 between the fluid impervious membrane 108 and the tool surface 104. At 806, the compaction pressure chamber 110 is sealed on the fluid impervious membrane 108 over the dry fabric layup 106. From 806, the method 800 advances to 508 of FIG. 5.

With reference again to FIGS. 1, 5, 8 and 9, in one or more examples, a method 900 for composite manufacturing includes the method 500 of FIG. 5, the method 800 of FIG. 8 and continues from 802 to 902 where a release film 144 is positioned over the dry fabric layup 106 prior to the positioning 802 of the fluid impervious membrane 108 such that the release film 144 is between the dry fabric layup 106 and the fluid impervious membrane 108. The release film 144 may also be referred to as peel ply. In another example, the method 900 also includes positioning 904 a breather cloth 146 over the release film 144 prior to the positioning 802 of the fluid impervious membrane 108 such that the breather cloth 146 is between the release film 144 and the fluid impervious membrane 108. The breather cloth 146 may also be referred to as resin flow control media. From 904, the method 900 advances to 804 of FIG. 8. In yet another example, the method 900 continues from 802 of FIGS. 8 to 906 where the method 900 includes positioning 906 a breather cloth 146 over the dry fabric layup 106 prior to the positioning 802 of the fluid impervious membrane 108 such that the breather cloth 146 is between the dry fabric layup 106 and the fluid impervious membrane 108. From 906, the method 900 advances to 804 of FIG. 8.

With reference again to FIGS. 1, 5, 8 and 10, in one or more examples, a method 1000 for composite manufacturing includes the method 500 of FIG. 5, the method 800 of FIG. 8 and continues from 806 to 1002 where a plate surface 120 of a curing plate 118 is positioned over the compaction pressure chamber 110. The plate surface 120 opposing the tool surface 104 of the curing tool 102. At 1004, the curing plate 118 is clamped to the curing tool 102 to enclose the dry fabric layup 106, the fluid impervious membrane 108 and the compaction pressure chamber 110 between the curing tool 102 and the curing plate 118. The curing plate 118 defines a cavity 122 between the fluid impervious membrane 108 and the plate surface 120.

In another example, the method 1000 also includes sealing 1006 a periphery 126 of the plate surface 120 of the curing plate 118 to an adjoining portion 128 of the fluid impervious membrane 108. Based on said sealing 1006, the plate surface 120 and the fluid impervious membrane 108 form the compaction pressure chamber 110 in conjunction with the cavity 122 defined by the curing plate 118. At 1008, the pressurized fluid 112 is received from the at least one compressed fluid source 114 at the curing plate 118. At 1010, the pressurized fluid 112 is provided from the curing plate 118 to the compaction pressure chamber 110. From 1010, the method 1000 advances to 508 of FIG. 5.

In yet another example of the method 1000, the compaction pressure chamber 110 includes at least one inflatable bladder 202. In this example, the method 1000 advances from 1004 to 1012 where the pressurized fluid 112 is received from the at least one compressed fluid source 114 at the curing plate 118. At 1014, the pressurized fluid 112 is provided from the curing plate 118 to each of the at least one inflatable bladder 202. From 1014, the method 1000 advances to 508 of FIG. 5.

With reference again to FIGS. 1, 3, 5 and 8, in another example of the method 800, the at least one liquid resin source 136 includes at least one resin well 304 defined by the tool surface 104 of the curing tool 102 in one or more resin supply areas 302 of the tool surface 104 spaced from a composite part area 306 of the tool surface 104. Each resin well 304 configured to hold and supply the liquid resin 116 to the dry fabric layup 106 during the resin infusion. The dry fabric layup 106 is positioned in the composite part area 306 on the tool surface 104 of the curing tool 102.

With reference again to FIGS. 1, 3, 5, 8 and 11, in one or more examples, a method 1100 for composite manufacturing includes the method 500 of FIG. 5, the method 800 of FIG. 8 and continues from 806 to 1102 where at least one resin pressure chamber 308 is positioned over the at least one resin well 304 of the curing tool 102. In another example, the method 1100 also includes supplying 1104 a second pressurized fluid 310 from the at least one compressed fluid source 114 to the at least one resin pressure chamber 308. The second pressurized fluid 310 being supplied at a resin pressure 152 above that of the standard atmosphere 150 and less than the compaction pressure 148 of the pressurized fluid 112 supplied to the compaction pressure chamber 110. The standard atmosphere 150 is a unit of pressure representative of the mean atmospheric pressure at sea level. For example, the standard atmosphere 150 can be expressed as 14.696 psi. In yet another example, the method 1100 also includes positioning 1106 a plate surface 120 of a curing plate 118 over the at least one resin pressure chamber 308 and the compaction pressure chamber 110. The plate surface 120 opposing the tool surface 104 of the curing tool 102. At 1108, the curing plate 118 is clamped to the curing tool 102 to enclose the dry fabric layup 106, the fluid impervious membrane 108, the at least one resin pressure chamber 308 and the compaction pressure chamber 110 between the curing tool 102 and the curing plate 118, the curing plate 118 defining a cavity 122 between the fluid impervious membrane 108 and the plate surface 120. From 1108, the method 1100 advances to 510 of FIG. 5.

With reference again to FIGS. 1, 3, 5, 8, 11 and 12, in one or more examples, a method 1200 for composite manufacturing includes the method 500 of FIG. 5, the method 800 of FIG. 8, the method 1100 of FIG. 11 and continues from 1108 to 1202 where a periphery 126 of the plate surface 120 of the curing plate 118 is sealed to an adjoining portion 128 of the fluid impervious membrane 108. At 1204, a central portion 314 of the plate surface 120 of the curing plate 118 is sealed to the adjoining portion 128 of the fluid impervious membrane 108 to isolate the at least one resin pressure chamber 308 from the compaction pressure chamber 110. Based on the sealing 1202 of the periphery 126 and the sealing 1204 of the central portion 314, the plate surface 120 and the fluid impervious membrane 108 form the compaction pressure chamber 110 over the dry fabric layup 106, form the at least one resin pressure chamber 308 over the at least one resin well 304 and isolate the at least one resin well 304 from the compaction pressure chamber 110. The compaction pressure chamber 110 and the at least one resin pressure chamber 308 formed in conjunction with the cavity 122 defined by the curing plate 118. At 1206, the pressurized fluid 112 is received from the at least one compressed fluid source 114 at the curing plate 118. At 1208, the pressurized fluid 112 is provided from the curing plate 118 to the compaction pressure chamber 110. At 1210, the second pressurized fluid 310 is received from the at least one compressed fluid source 114 at the curing plate 118. At 1212, the second pressurized fluid 310 is provided from the curing plate 118 to the at least one resin pressure chamber 308. From 1212, the method 1200 advances to 510 of FIG. 5.

With reference again to FIGS. 1, 3, 5, 8, 11 and 13, in one or more examples, a method 1300 for composite manufacturing includes the method 500 of FIG. 5, the method 800 of FIG. 8, the method 1100 of FIG. 11. In method 1300, the at least one resin pressure chamber 308 includes an inflatable bladder 402. Method 1300 continues from 1108 of FIGS. 11 to 1302 where the second pressurized fluid 310 is received from the at least one compressed fluid source 114 at the curing plate 118. At 1304, the second pressurized fluid 310 is provided from the curing plate 118 to the inflatable bladder 402. From 1304, the method 1300 advances to 510 of FIG. 5.

Figure 14:
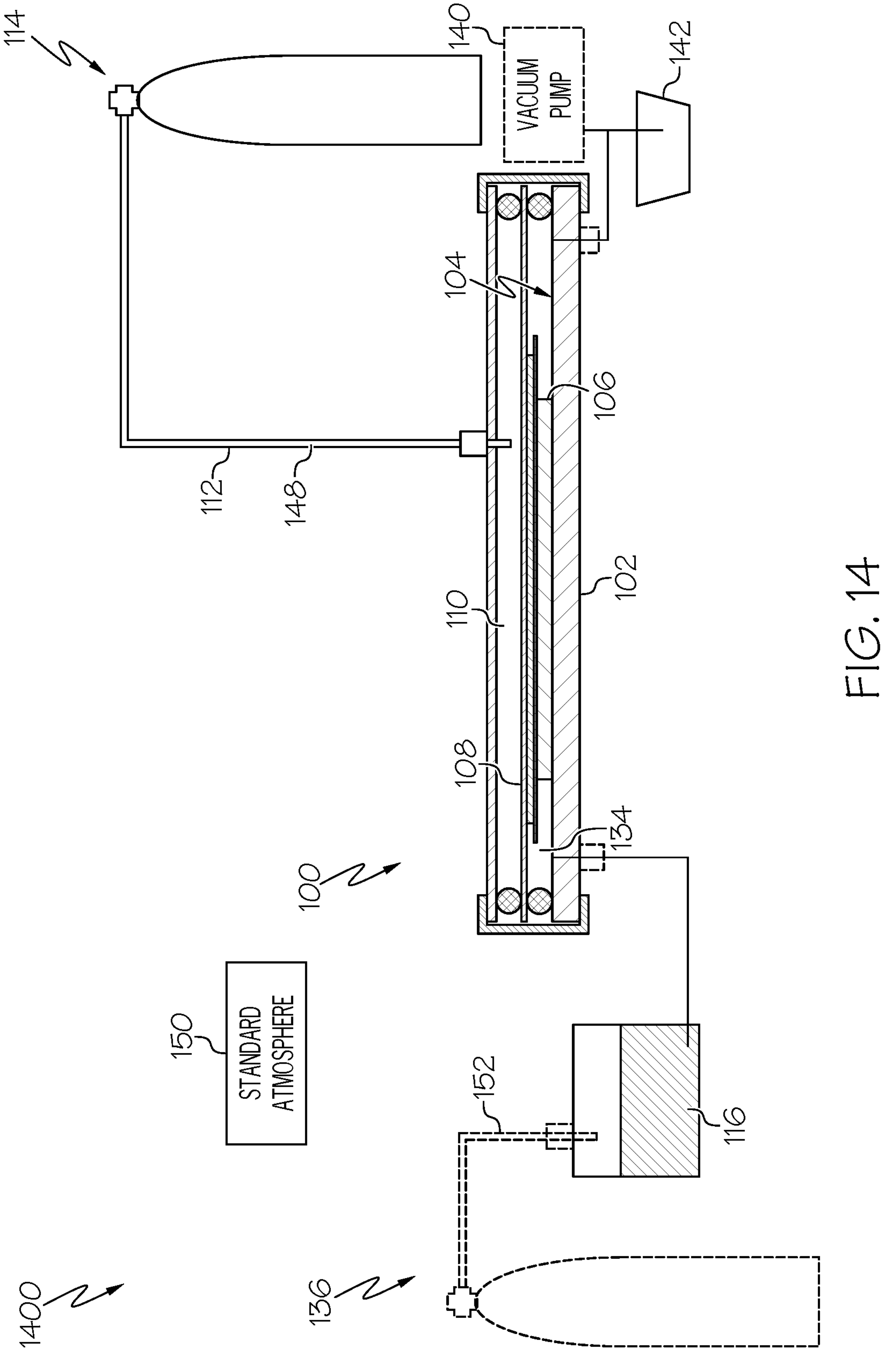
FIG. 14 is a functional diagram of an example of a system for composite manufacturing.

Referring generally to FIGS. 1-4 and 14, by way of examples, the present disclosure is directed to a system 1400 for composite manufacturing. FIGS. 1-4 disclose several examples of the curing tool assembly 100. FIG. 14 the system 1400 for the composite manufacturing.

With reference again to FIGS. 1-4 and 14, in one or more examples, a system 1400 for composite manufacturing includes at least one compressed fluid source 114 and a curing tool assembly 100. The curing tool assembly 100 includes a curing tool 102, a fluid impervious membrane 108 and a compaction pressure chamber 110. The curing tool 102 includes a tool surface 104 configured to receive a dry fabric layup 106. The fluid impervious membrane 108 configured to overlay the dry fabric layup 106 received on the tool surface 104 of the curing tool 102. The a compaction pressure chamber 110 configured to overlay the fluid impervious membrane 108. The compaction pressure chamber 110 further configured to receive a pressurized fluid 112 from the at least one compressed fluid source 114 during resin infusion of the dry fabric layup 106. The pressurized fluid 112 being received at a compaction pressure 148 above that of a standard atmosphere 150. The standard atmosphere 150 is a unit of pressure representative of the mean atmospheric pressure at sea level. For example, the standard atmosphere 150 can be expressed as 14.696 psi.

In another example of the system 1400, the dry fabric layup 106 includes a preform dry fabric layup. In a further example, the preform dry fabric layup includes a plurality of dry fabric plies that are tacked using a localized melted thermoplastic veil. In yet another example of the system 1400, the fluid impervious membrane 108 includes a rubber material, a thermoplastic elastomer material, a reinforced polyimide, a fiber reinforced elastomeric material, a fiberglass material, a silicone material or any other suitable material in any suitable combination. In still another example of the system 1400, the fluid impervious membrane 108 includes a vacuum bag. In still yet another example of the system 1400, the compaction pressure chamber 110 is configured to apply a compaction force on the fluid impervious membrane 108 and the dry fabric layup 106 during the resin infusion in response to receiving the pressurized fluid 112.

In another example of the system 1400, the compaction pressure 148 at which the pressurized fluid 112 is received from the at least one compressed fluid source 114 is about two standard atmospheres or higher, about three standard atmospheres or higher, about four standard atmospheres or higher or any other suitable pressure above the standard atmosphere 150. For example, two standard atmospheres can be expressed as 29.392 psi, three standard atmospheres can be expressed as 44.088 psi and four standard atmospheres can be expressed as 58.784 psi. In a further example, the compaction pressure 148 at which the pressurized fluid 112 is received from the at least one compressed fluid source 114 is above a resin pressure applied to a liquid resin 116 during the resin infusion of the dry fabric layup 106. In yet another example of the system 1400, the pressurized fluid 112 includes a compressed air, a compressed nitrogen, a compressed inert gas or any other suitable pressurized fluid in any suitable combination.

In still another example of the system 1400, the curing tool assembly 100 also includes a release film 144 configured to be positioned over the dry fabric layup 106 prior to positioning the fluid impervious membrane 108 over the dry fabric layup 106. In still yet another example of the system 1400, the curing tool assembly 100 also includes a breather cloth 146 configured to be positioned over the dry fabric layup 106 prior to positioning the fluid impervious membrane 108 over the dry fabric layup 106.

In still yet another example of the system 1400, the curing tool assembly 100 also includes a curing plate 118 with a plate surface 120 opposing the tool surface 104 of the curing tool 102. The curing plate 118 configured to be clamped to the curing tool 102 to enclose the fluid impervious membrane 108 and the compaction pressure chamber 110 between the curing tool 102 and the curing plate 118 during the resin infusion of the dry fabric layup 106. The curing plate 118 defines a cavity 122 between the fluid impervious membrane 108 and the plate surface 120. In a further example, the curing plate 118 includes a metallic material. In an even further example, the metallic material includes a steel, a stainless steel, a cobalt-chromium alloy or any other suitable metallic material in any suitable combination.

In another further example, the curing tool assembly 100 also includes a seal 124 configured for placement between a periphery 126 of the plate surface 120 of the curing plate 118 and an adjoining portion 128 of the fluid impervious membrane 108 during the resin infusion. The plate surface 120, the seal 124 and the fluid impervious membrane 108 form the compaction pressure chamber 110 in conjunction with the cavity 122 defined by the curing plate 118. The curing plate 118 configured to receive the pressurized fluid 112 from the at least one compressed fluid source 114 during the resin infusion and configured to provide the pressurized fluid 112 to the compaction pressure chamber 110 during the resin infusion.

In yet another further example, the compaction pressure chamber 110 includes at least one inflatable bladder 202. The curing plate 118 is configured to receive the pressurized fluid 112 from the at least one compressed fluid source 114 and configured to provide the pressurized fluid 112 to each of the at least one inflatable bladder 202.

In another example of the system 1400, the tool surface 104 of the curing tool 102 includes one or more resin supply areas 302 defining at least one resin well 304. The one or more resin supply areas 302 spaced from a composite part area 306 of the tool surface 104. Each resin well 304 configured to hold and supply a liquid resin 116 during the resin infusion. The composite part area 306 configured to receive the dry fabric layup 106.

In a further example, the curing tool assembly 100 also includes at least one resin pressure chamber 308 configured to overlay the at least one resin well 304 of the curing tool 102. The at least one resin pressure chamber 308 further configured to receive a second pressurized fluid 310 from the at least one compressed fluid source 114 during the resin infusion of the dry fabric layup 106. The second pressurized fluid 310 being received at a resin pressure above that of the standard atmosphere 150 and less than the compaction pressure 148 of the pressurized fluid 112 associated with the compaction pressure chamber 110. The standard atmosphere 150 is a unit of pressure representative of the mean atmospheric pressure at sea level. For example, the standard atmosphere 150 can be expressed as 14.696 psi.

In an even further example, the curing tool assembly 100 also includes a curing plate 118 with a plate surface 120 opposing the tool surface 104 of the curing tool 102. The curing plate 118 configured to be clamped to the curing tool 102 to enclose the fluid impervious membrane 108, the at least one resin pressure chamber 308 and the compaction pressure chamber 110 between the curing tool 102 and the curing plate 118 during the resin infusion of the dry fabric layup 106. The curing plate 118 defines a cavity 122 between the fluid impervious membrane 108 and the plate surface 120.

In an even yet further example, the curing tool assembly 100 also includes a seal 124 and a second seal 312. The seal 124 configured for placement between a periphery 126 of the plate surface 120 of the curing plate 118 and an adjoining portion 128 of the fluid impervious membrane 108 during the resin infusion. The second seal 312 configured for placement between the plate surface 120 of the curing plate 118 and the fluid impervious membrane 108 to isolate the at least one resin pressure chamber 308 from the compaction pressure chamber 110 during the resin infusion. The plate surface 120, the seal 124, the second seal 312 and the fluid impervious membrane 108 form the at least one resin pressure chamber 308 and the compaction pressure chamber 110. The curing plate 118 is configured to receive the pressurized fluid 112 from the at least one compressed fluid source 114 and configured to provide the pressurized fluid 112 to the compaction pressure chamber 110. The curing plate 118 is configured to receive the second pressurized fluid 310 from the at least one compressed fluid source 114 and configured to provide the second pressurized fluid 310 to the at least one resin pressure chamber 308.

In another even yet further example, the at least one resin pressure chamber 308 includes an inflatable bladder 402. The curing plate 118 is configured to receive the second pressurized fluid 310 from the at least one compressed fluid source 114 and configured to provide the second pressurized fluid 310 to the inflatable bladder 402.

In yet another example of the system 1400, the curing tool assembly 100 also includes a seal 130 configured for placement between a periphery 132 of the tool surface 104 of the curing tool 102 and an adjoining portion 128 of the fluid impervious membrane 108 to form a sealed volume 134 around the dry fabric layup 106 during the resin infusion.

In a further example, the system 1400 also includes at least one liquid resin source 136 configured to supply a liquid resin 116 to the curing tool 102 during the resin infusion. The curing tool 102 configured to supply the liquid resin 116 from the at least one liquid resin source 136 to the sealed volume 134 during the resin infusion.

In an even further example, the liquid resin 116 is received at a resin pressure above that of the standard atmosphere 150 and less than the compaction pressure 148 of the pressurized fluid 112 associated with the compaction pressure chamber 110. The standard atmosphere 150 is a unit of pressure representative of the mean atmospheric pressure at sea level. For example, the standard atmosphere 150 can be expressed as 14.696 psi. In an even yet further example, the at least one liquid resin source 136 includes one or more resin pressure pots 138, one or more resin injection machines, or any other suitable liquid resin source in any suitable combination.

In another even further example, the system 1400 also includes at least one vacuum pump 140 in fluid communication with the curing tool 102 and configured to draw a vacuum on the sealed volume 134 during the resin infusion. In an even yet further example, the system 1400 is configured to use the vacuum to draw the liquid resin 116 into the sealed volume 134 during the resin infusion. In another even yet further example, the system 1400 also includes a resin waste bin 142 in fluid communication with the at least one vacuum pump 140 and the curing tool 102 and configured to receive residual resin from the sealed volume 134 for collection of the residual resin in response to the vacuum drawn on the sealed volume 134.

Examples of curing tool assemblies 100, methods 500, 600, 700, 800, 900, 1000, 1100, 1200, 1300, 1700 and systems 1400 for composite manufacturing may be related to or used in the context of aircraft manufacturing. Although an aircraft example is described, the examples and principles disclosed herein may be applied to other products in the aerospace industry and other industries, such as the automotive industry, the space industry, the construction industry and other design and manufacturing industries. Accordingly, in addition to aircraft, the examples and principles disclosed herein may apply to the use of composite products in the manufacture of various types of vehicles and in the construction of various types of buildings.

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic and/or operational step described in connection with the example is included in at least one aspect, embodiment and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first." "second," "third," etc. are used herein merely as labels and are not intended to impose ordinal, positional, or hierarchical requirements on the items to which these terms refer. Moreover, reference to, e.g., a "second" item does not require or preclude the existence of, e.g., a "first" or lower-numbered item and/or, e.g., a "third" or higher-numbered item.

As used herein, the phrase "at least one of," when used with a list of items, means different combinations of one or more of the listed items may be used and only one of each item in the list may be needed. For example, "at least one of item A, item B and item C" may include, without limitation, item A or item A and item B. This example also may include item A, item B and item C or item B and item C. In other examples, "at least one of" may be, for example, without limitation, two of item A, one of item B and ten of item C; four of item B and seven of item C; and other suitable combinations. As used herein, the term "and/or" and the "/" symbol includes any and all combinations of one or more of the associated listed items.

As used herein, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

In FIGS. 1-4 and 14-17, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features and/or components described and illustrated in FIGS. 1-4 and 14-17, referred to above, need be included in every example and not all elements, features and/or components described herein are necessarily depicted in each illustrative example. Accordingly, some of the elements, features and/or components described and illustrated in FIGS. 1-4 and 14-17 may be combined in various ways without the need to include other features described and illustrated in FIGS. 1-4 and 14-17, other drawing figures and/or the accompanying disclosure, even though such combination or combinations are not explicitly illustrated herein. Similarly, additional features not limited to the examples presented, may be combined with some or all the features shown and described herein. Unless otherwise explicitly stated, the schematic illustrations of the examples depicted in FIGS. 1-4 and 14-17, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features and/or components that serve a similar, or at least substantially similar, purpose are labeled with like numbers in each of FIGS. 1-4 and 14-17 and such elements, features and/or components may not be discussed in detail herein with reference to each of FIGS. 1-4 and 14-17. Similarly, all elements, features and/or components may not be labeled in each of FIGS. 1-4 and 14-17, but reference numerals associated therewith may be utilized herein for consistency.

In FIGS. 5-13 and 17, referred to above, the blocks may represent operations, steps and/or portions thereof and lines connecting the various blocks do not imply any particular order or dependency of the operations or portions thereof. It will be understood that not all dependencies among the various disclosed operations are necessarily represented. FIGS. 5-13 and 17 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages and similar language used throughout the present disclosure may, but does not necessarily, refer to the same example.

Figure 18:
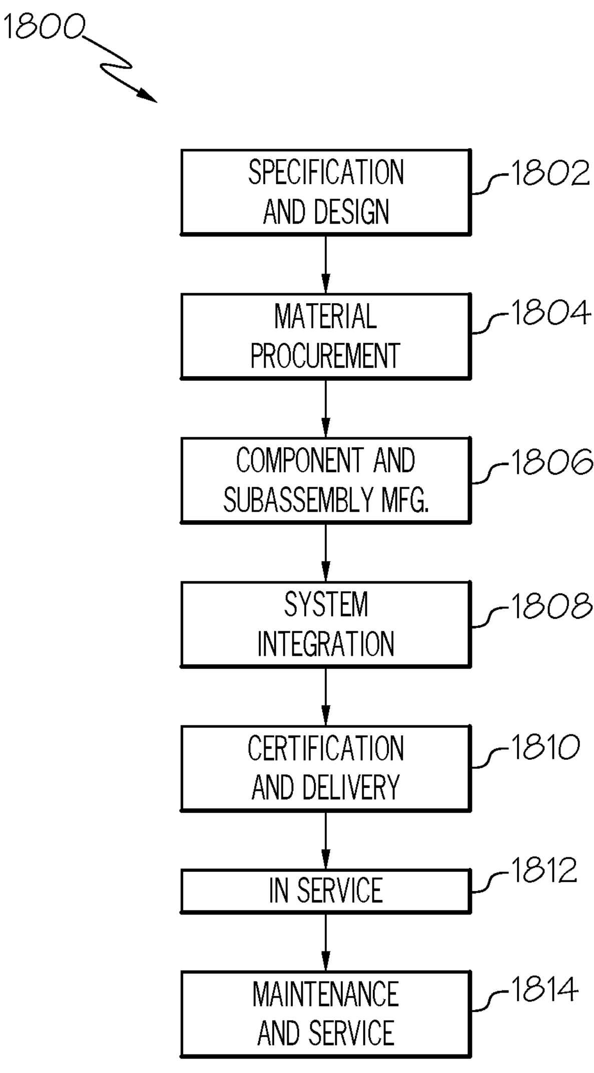
FIG. 18 is a block diagram of aircraft production and service methodology the implements one or more of the examples of methods for composite manufacturing disclosed herein.
Figure 19:
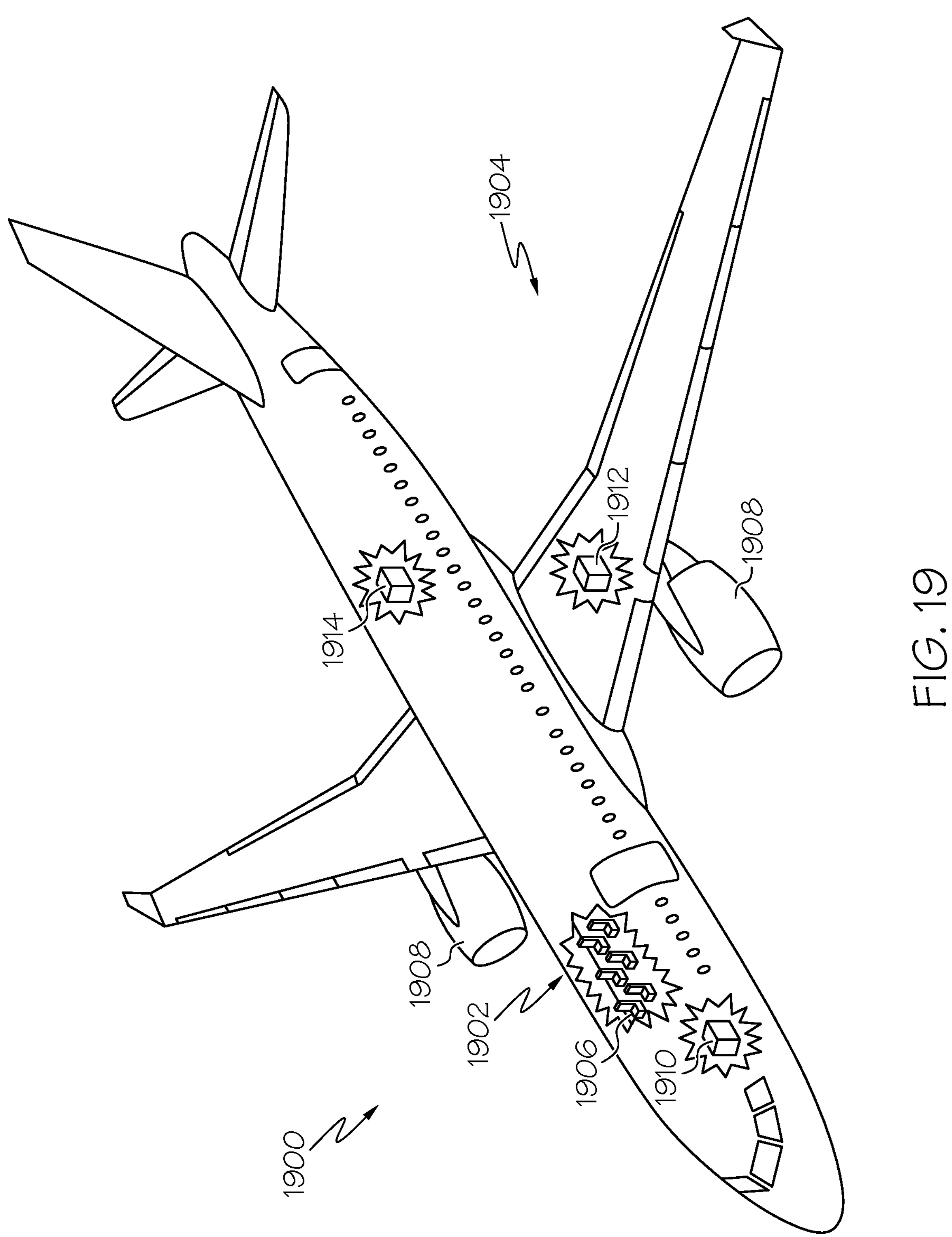
FIG. 19 is a schematic illustration of an aircraft that incorporates one or more part produced using one or more of the examples of curing tool assemblies, methods and systems for composite manufacturing disclosed herein.

Examples of the subject matter disclosed herein may be described in the context of aircraft manufacturing and service method 1800 as shown in FIG. 18 and aircraft 1900 as shown in FIG. 19. In one or more examples, the disclosed methods and systems for associating test data for a part under test with an end item coordinate system may be used in aircraft manufacturing. During pre-production, the service method 1800 may include specification and design (block 1802) of aircraft 1900 and material procurement (block 1804). During production, component and subassembly manufacturing (block 1806) and system integration (block 1808) of aircraft 1900 may take place. Thereafter, aircraft 1900 may go through certification and delivery (block 1810) to be placed in service (block 1812). While in service, aircraft 1900 may be scheduled for routine maintenance and service (block 1814). Routine maintenance and service may include modification, reconfiguration, refurbishment, etc. of one or more systems of aircraft 1900.

Each of the processes of the service method 1800 may be performed or carried out by a system integrator, a third party and/or an operator (e.g., a customer). For the purposes of this description, a system integrator may include, without limitation, any number of aircraft manufacturers and major-system subcontractors; a third party may include, without limitation, any number of vendors, subcontractors and suppliers; and an operator may be an airline, leasing company, military entity, service organization and so on.

As shown in FIG. 19, aircraft 1900 produced by the service method 1800 may include airframe 1902 with a plurality of high-level systems 1904 and interior 1906. Examples of high-level systems 1904 include one or more of propulsion system 1908, electrical system 1910, hydraulic system 1912 and environmental system 1914. Any number of other systems may be included. Although an aerospace example is shown, the principles disclosed herein may be applied to other industries, such as the automotive industry. Accordingly, in addition to aircraft 1900, the principles disclosed herein may apply to other vehicles, e.g., land vehicles, marine vehicles, space vehicles, etc.

The disclosed systems and methods for associating test data for a part under test with an end item coordinate system may be employed during any one or more of the stages of the manufacturing and service method 1800. For example, components or subassemblies corresponding to component and subassembly manufacturing (block 1806) may be fabricated or manufactured in a manner similar to components or subassemblies produced while aircraft 1900 is in service (block 1812). Also, one or more examples of the system(s), method(s), or combination thereof may be utilized during production stages (block 1806 and block 1808), for example, by substantially expediting assembly of or reducing the cost of aircraft 1900. Similarly, one or more examples of the system or method realizations, or a combination thereof, may be utilized, for example and without limitation, while aircraft 1900 is in service (block 1812) and/or during maintenance and service (block 1814).

The described features, advantages and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the curing tool assemblies 100, methods 500, 600, 700, 800, 900, 1000, 1100, 1200, 1300, 1700 and systems 1400 for composite manufacturing have been shown and described, modifications may occur to those skilled in the art upon reading the specification. The present application includes such modifications and is limited only by the scope of the claims.

What is claimed is:

1. A curing tool assembly for composite manufacturing, comprising:

a curing tool comprising a tool surface with one or more resin supply areas and a composite part area, each of the one or more resin supply areas defining at least one resin well, the composite part area configured to receive a dry fabric layup, the one or more resin supply areas spaced from the composite part area of the tool surface, each resin well configured to hold and supply a liquid resin to the dry fabric layup during resin infusion;

a curing plate comprising a plate surface opposing the tool surface of the curing tool;

a fluid impervious membrane configured to overlay the dry fabric received on the tool surface of the curing tool;

a compaction pressure chamber configured to overlay the dry fabric layup received on the tool surface of the curing tool, the compaction pressure chamber further configured to receive a pressurized fluid from at least one compressed fluid source during the resin infusion of the dry fabric layup, the pressurized fluid being received at a compaction pressure above that of a standard atmosphere; and at least one resin pressure chamber formed by the curing plate, the fluid impervious membrane, a first seal between the curing plate and the fluid impervious membrane at a peripheral end of the fluid impervious membrane and a second seal between the compaction pressure chamber and the at least one resin pressure chamber, the at least one resin pressure chamber and configured to overlay the at least one resin well, the at least one resin pressure chamber further configured to receive a second pressurized fluid from the at least one compressed fluid source during the resin infusion of the dry fabric layup;

wherein the at least one resin pressure chamber is sealed and isolated from the compaction pressure chamber by the second seal, such that, during the resin infusion, the second pressurized fluid in the at least one resin pressure chamber is isolated from the pressurized fluid in the compaction pressure chamber.

2. The curing tool assembly of claim 1 wherein the compaction pressure at which the pressurized fluid is received from the at least one compressed fluid source is at least one of about two standard atmospheres or higher, about three standard atmospheres or higher and about four standard atmospheres or higher.

3. The curing tool assembly of claim 2 wherein the compaction pressure at which the pressurized fluid is received from the at least one compressed fluid source is above a resin pressure applied to a liquid resin during the resin infusion of the dry fabric layup.

4. The curing tool assembly of claim 1 wherein the pressurized fluid comprises at least one of a compressed air, a compressed nitrogen and a compressed inert gas.

5. The curing tool assembly of claim 1 wherein the fluid impervious membrane is positioned between the dry fabric layup and the compaction pressure chamber.

6. The curing tool assembly of claim 5 wherein the compaction pressure chamber is configured to apply a compaction force on the fluid impervious membrane and the dry fabric layup during the resin infusion in response to receiving the pressurized fluid.

7. The curing tool assembly of claim 5 wherein the curing plate is configured to be clamped to the curing tool to enclose the fluid impervious membrane and the compaction pressure chamber between the curing tool and the curing plate during the resin infusion of the dry fabric layup, the curing plate defining a cavity between the fluid impervious membrane and the plate surface.

8. The curing tool assembly of claim 7 wherein the first seal is configured for placement between the periphery of the plate surface of the curing plate and an adjoining portion of the fluid impervious membrane during the resin infusion, wherein the plate surface, the second seal and the fluid impervious membrane form the compaction pressure chamber in conjunction with the cavity defined by the curing plate, the curing plate configured to receive the pressurized fluid from the at least one compressed fluid source during the resin infusion and configured to provide the pressurized fluid to the compaction pressure chamber during the resin infusion.

9. The curing tool assembly of claim 7, the compaction pressure chamber comprising:

at least one inflatable bladder, the curing plate configured to receive the pressurized fluid from the at least one compressed fluid source and configured to provide the pressurized fluid to each of the at least one inflatable bladder.

10. The curing tool assembly of claim 5 wherein the second pressurized fluid is received at a resin pressure above that of the standard atmosphere and less than the compaction pressure of the pressurized fluid associated with the compaction pressure chamber.

11. The curing tool assembly of claim 5, further comprising:

a curing plate comprising a plate surface opposing the tool surface of the curing tool, the curing plate configured to be clamped to the curing tool to enclose the fluid impervious membrane, the at least one resin pressure chamber and the compaction pressure chamber between the curing tool and the curing plate during the resin infusion of the dry fabric layup, the curing plate defining a cavity between the fluid impervious membrane and the plate surface.

12. The curing tool assembly of claim 11 wherein the first seal is configured for placement between the periphery of the plate surface of the curing plate and an adjoining portion of the fluid impervious membrane during the resin infusion, wherein the second seal is configured for placement between the plate surface of the curing plate and the fluid impervious membrane to isolate the at least one resin pressure chamber from the compaction pressure chamber during the resin infusion, wherein the plate surface, the first seal, the second seal and the fluid impervious membrane form the at least one resin pressure chamber and the compaction pressure chamber, the curing plate configured to receive the pressurized fluid from the at least one compressed fluid source and configured to provide the pressurized fluid to the compaction pressure chamber, the curing plate configured to receive the second pressurized fluid from the at least one compressed fluid source and configured to provide the second pressurized fluid to the at least one resin pressure chamber.

13. The curing tool assembly of claim 11, the at least one resin pressure chamber comprising:

an inflatable bladder, the curing plate configured to receive the second pressurized fluid from the at least one compressed fluid source and configured to provide the second pressurized fluid to the inflatable bladder.

14. The curing tool assembly of claim 5, further comprising:

a third seal configured for placement between a periphery of the tool surface of the curing tool and an adjoining portion of the fluid impervious membrane to form a sealed volume around the dry fabric layup during the resin infusion.

15. The curing tool assembly of claim 14 wherein the curing tool is configured to receive a liquid resin from at least one liquid resin source during the resin infusion and configured to supply the liquid resin to the sealed volume during the resin infusion.

16. The curing tool assembly of claim 15 wherein the curing tool is configured for fluid communication with at least one vacuum pump to draw a vacuum on the sealed volume during the resin infusion.

17. A system for composite manufacturing, comprising:

at least one compressed fluid source; and a curing tool assembly, comprising:

a curing tool comprising a tool surface with one or more resin supply areas and a composite part area, each of the one or more resin supply areas defining at least one resin well, the composite part area configured to receive a dry fabric layup, the one or more resin supply areas spaced from the composite part area off the tool surface, each resin well configured to hold and supply a liquid resin to the dry fabric layup during resin infusion;

a curing plate comprising a plate surface opposing the tool surface of the curing tool;

a fluid impervious membrane configured to overlay the dry fabric layup received on the tool surface of the curing tool;

a compaction pressure chamber configured to overlay the fluid impervious membrane, the compaction pressure chamber further configured to receive a pressurized fluid from the at least one compressed fluid source during resin infusion of the dry fabric layup, the pressurized fluid being received at a compaction pressure above that of a standard atmosphere; and at least one resin pressure chamber formed by the curing plate, the fluid impervious membrane, a first seal between the curing plate and the fluid impervious membrane at a peripheral end of the fluid impervious membrane and a second seal between the compaction pressure chamber and the at least one resin pressure chamber, the at least one resin pressure chamber and configured to overlay the at least one resin well, the at least one resin pressure chamber further configured to receive a second pressurized fluid from the at least one compressed fluid source during the resin infusion of the dry fabric layup.

18. The system of claim 17 wherein the second pressurized fluid is received at a resin pressure above that of the standard atmosphere and less than the compaction pressure from the at least one compressed fluid source.

19. The system of claim 17 wherein the compaction pressure at which the pressurized fluid is received from the at least one compressed fluid source is about two standard atmospheres or higher.

20. The system of claim 17 wherein the fluid impervious membrane is positioned between the dry fabric layup and the compaction pressure chamber, the curing tool assembly further comprising:

a third seal configured for placement between a periphery of the tool surface of the curing tool and an adjoining portion of the fluid impervious membrane to form a sealed volume around the dry fabric layup during the resin infusion.

* * * * *